United States Patent [19] … [11] 4,280,022
Sekiguchi et al. … [45] Jul. 21, 1981

[54] KEY TELEPHONE SYSTEMS

[75] Inventors: Koichi Sekiguchi, Asaka; Hikaru Takematsu, Higashikurume; Kazutada Tatsukura, Tokorozawa, all of Japan

[73] Assignee: Iwasaki Tsushinki Kabushiki Kaisha, Tokyo, Japan

[21] Appl. No.: 6,519

[22] Filed: Jan. 25, 1979

[30] Foreign Application Priority Data

Feb. 7, 1978 [JP] Japan ................ 53-11893
Feb. 7, 1978 [JP] Japan ................ 53-11894
Feb. 7, 1978 [JP] Japan ................ 53-11895
Feb. 7, 1978 [JP] Japan ................ 53-11896

[51] Int. Cl.³ ........................... H04Q 5/20
[52] U.S. Cl. .................. 179/99 A; 179/99 P; 179/1 CN; 179/18 BF
[58] Field of Search ............. 179/99, 1 CN, 18 BC, 179/18 AD, 1 H, 1 HF, 37, 18 BF

[56] References Cited

U.S. PATENT DOCUMENTS

| 3,703,611 | 11/1972 | Kiyomiya et al. | 179/1 CN |
|---|---|---|---|
| 3,872,262 | 3/1975 | Kerman | 179/99 P |
| 3,898,392 | 8/1975 | Jackson | 179/99 P |
| 3,904,834 | 9/1975 | Shinoi et al. | 179/99 A |
| 3,927,278 | 12/1975 | Tsutsumi et al. | 179/99 P |
| 4,001,517 | 1/1977 | Biblack et al. | 179/99 P |
| 4,031,329 | 6/1977 | Jaxon | 179/18 BF |
| 4,032,724 | 6/1977 | Matheny | 179/99 P |
| 4,086,444 | 4/1978 | Smith et al. | 179/18 AD |
| 4,158,112 | 6/1979 | Cerbone et al. | 179/99 A |
| 4,175,216 | 11/1979 | Kita et al. | 179/18 BF |

Primary Examiner—Gerald L. Brigance
Attorney, Agent, or Firm—Robert E. Burns; Emmanuel J. Lobato

[57] ABSTRACT

A key telephone system adapted to selectively connect a plurality of key telephone sets to a plurality of CO lines through a key service unit and pluralities of talking lines and control lines and provided with a calling device in at least one of the key telephone sets, in which automatic holding of the CO line is enabled upon depression of a calling key. In case of transferring the incoming call from a receiving key telephone set to a called one of the other key telephone set, depression of the individual calling switch automatically starts calling of the called key telephone set and enables the called party to recognize the incoming call by means of lamp indication and answer the calling CO line. The number of cable conductors interconnecting the key service unit and the key telephone sets is effectively reduced.

20 Claims, 15 Drawing Figures

KEY TELEPHONE SYSTEMS

BACKGROUND OF THE INVENTION

1. Field of the Invention

This invention relates to a key telephone system.

2. Description of the Prior Art

When to make an intercomm. call from a key telephone set by depressing a calling key provided in a calling device or the like during communication with a CO line, it is the practice in the prior art to depress the calling key after depressing a holding key provided in the key telephone set to hold the CO line. However, this method involves two key depressing operations and hence is inconvenient and is likely to lead to an erroneous operation. To avoid such inconvenience, there has also been proposed a system of holding the CO line by depressing the calling key to mechanically actuate the holding key in ganged relation thereto, but this system has the defects of its complicated and bulky structure and low reliability.

Intercomm. individual calling in a key telephone system is usually achieved by dialing individual numbers respectively assigned to key telephone sets, but this method requires dialing for each call and hence is inefficient and inconvenient especially when to frequently call from a key telephone set receiving an incoming call from a CO line. To correct such a defect, there has been proposed a system of calling a called party by depressing a corresponding one of calling keys, each provided for one key telephone set, instead of dialing. Also with this method, however, it is necessary to continue calling until the called party answers. For example, in a case where the receiving key telephone set transfers the incoming call signal from a CO line to a called key telephone set, calling must be continued until the cable party answers.

SUMMARY OF THE INVENTION

To overcome these defects, an object of this invention is to provide a holding system for a key telephone system which employs an electronic circuit to enable automatic holding of the CO line upon depression of a calling key.

To remedy such drawbacks of the prior art, another object of this invention is to provide a calling system for a key telephone system in which, in case of transferring the incoming call from a receiving key telephone set to a called one of the other key telephone set, depression of the aforesaid individual calling switch automatically starts calling of the called key telephone set and enables the called party to recognize the incoming call by means of lamp indication and answer the calling CO line, thereby eliminating the mediation of the operator to provide for markedly enhanced efficiency in operation of the operator.

Further object of this invention is to provide a talking system for a key telephone system which enables marked reduction of the number of cable conductors interconnecting the key service unit and key telephone sets.

To remove such defects of prior art, still another object of this invention is to provide a hand-free talking system in a key telephone system in which each key telephone set has a hybrid circuit, in which a key service unit has a memory circuit for storing the counting result of a counter and switching means connected to a speech path and turned ON by the output from the memory circuit, in which the switching means and the hybrid circuit are interconnected via a cable to enable hand-free talking and omit cables for the transmission of a microphone signal and a speaker signal and in which upon connection with a called key telephone set, the counter is opened for its effective utilization.

BRIEF DESCRIPTION OF THE DRAWINGS

This principle, construction and operation of this invention will be clearly understood from the following detailed description taken in conjunction with the accompanying drawings, in which.

DESCRIPTION OF THE PREFERRED EMBODIMENTS

Figure 1:
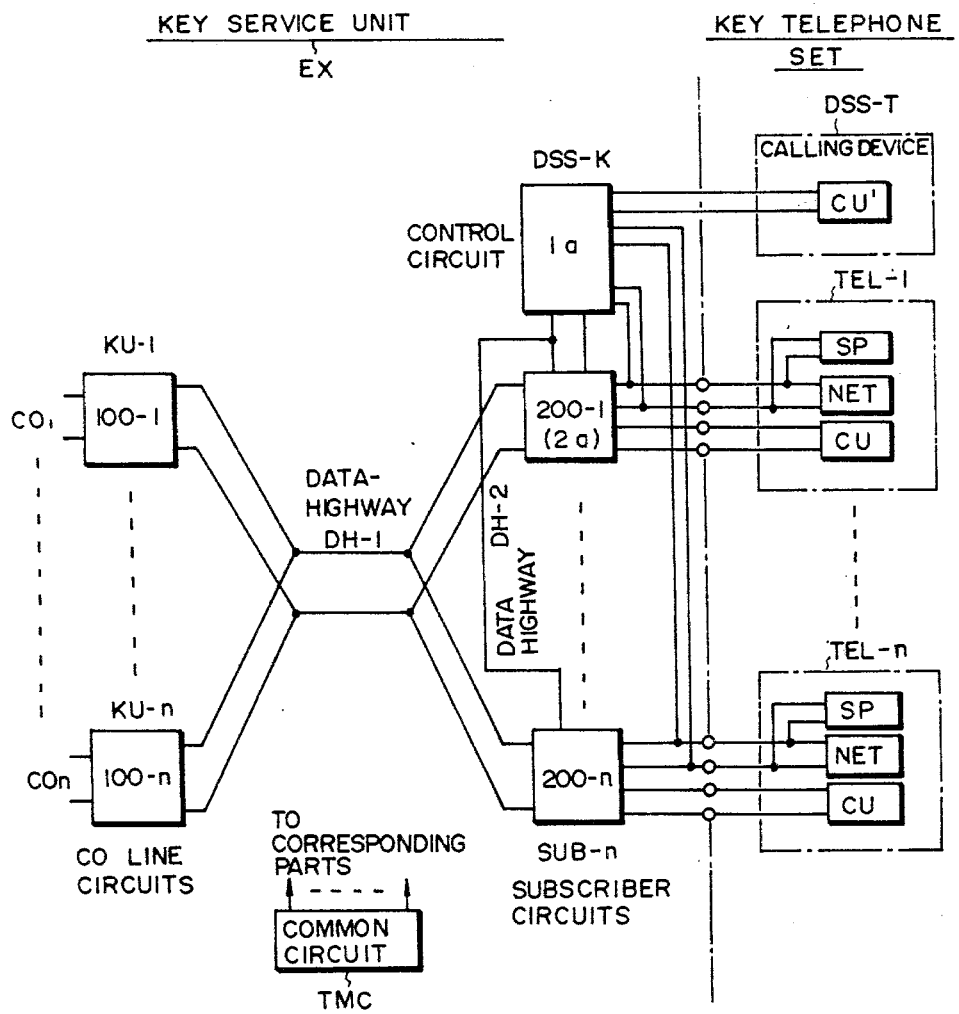
FIG. 1 is a block diagram showing a key telephone system of this invention.

FIG. 1 is a block diagram illustrating the entire system of the key telephone system to which this invention is related. Reference characters $CO_1$ through $CO_n$ indicate CO lines; 100-1 through 100-n designate CO line circuits which are each provided corresponding to one of the CO lines and connected to a data highway DH; 200-1 through 200-n identify subscriber circuits respectively corresponding to key telephone sets TEL-1 through TEL-n; TMC denotes a common circuit which generates control signals for controlling the CO line circuits 100-1 through 100-n and the subscriber circuits 200-1 through 200-n; NET in each key telephone set TEL represents a talking circuit; CU shows a key telephone set control circuit; SP refers to a speaker circuit; DSS-T indicates a calling device for use in this invention; CU' designates its control circuit; and DSS-K identifies a key service unit control circuit of the calling device.

Figure 2:
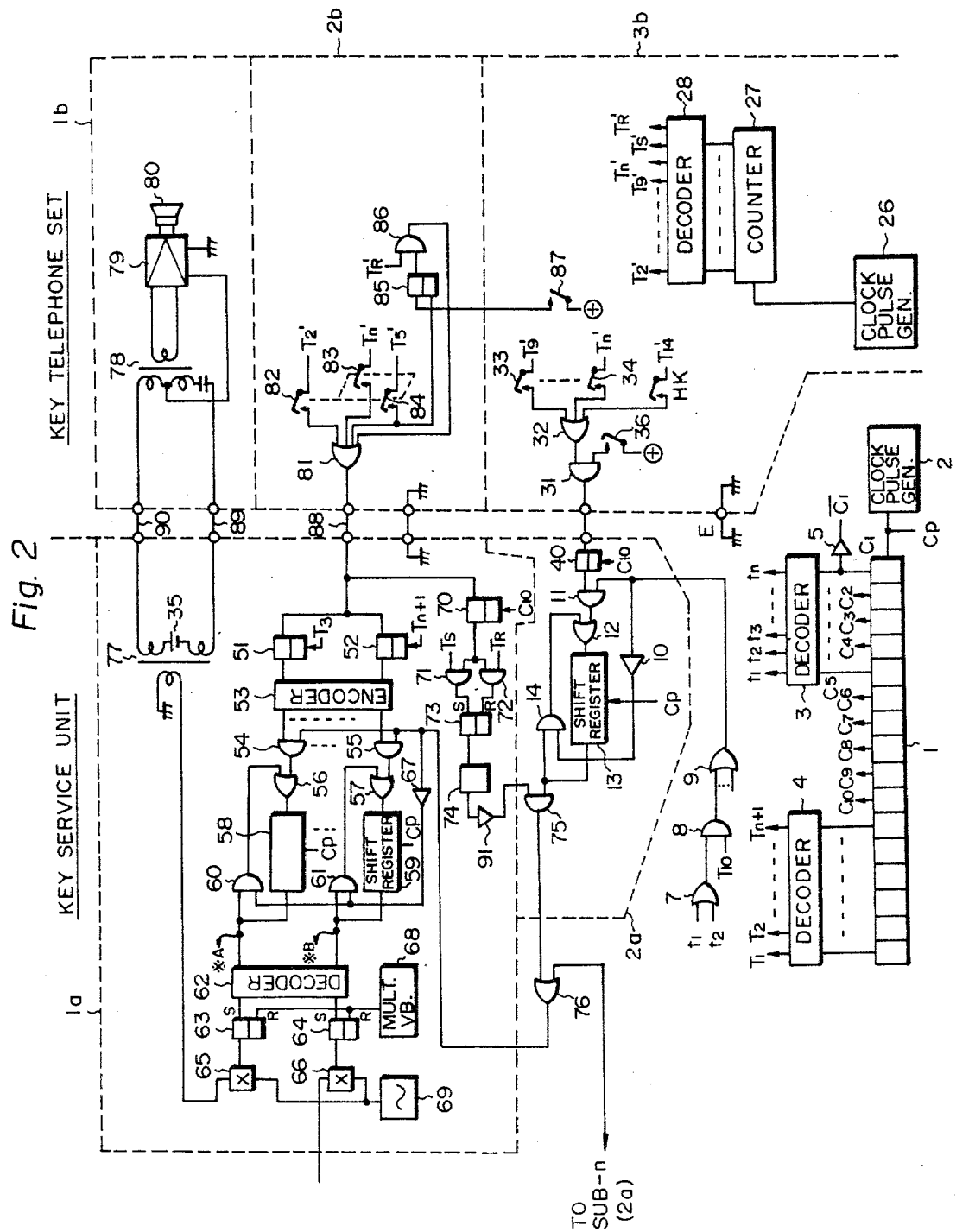
FIGS. 2 and 7 are block diagrams illustrating examples of a call control circuit for use in this invention.
Figure 3:
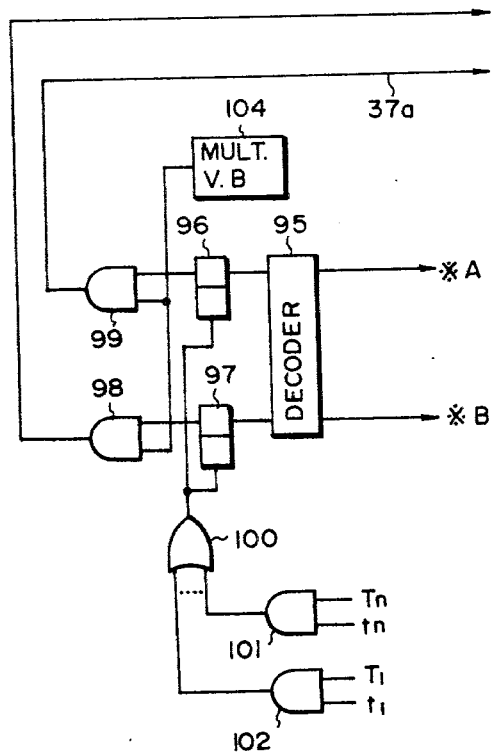
Figure 4:
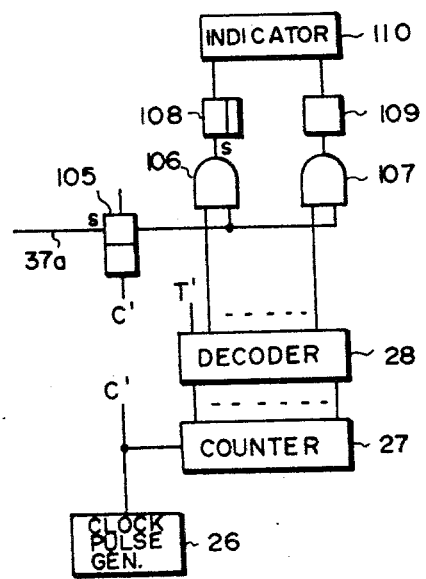
FIG. 4 is a block diagram illustrating an example of a control circuit for indication provided on the side of a key telephone set in this invention.

For convenience of the following detailed description of the operation of this invention, circuit diagrams of paths [TEL-1→200-1→$1c$→200-n→($2a$)] and [CU'($2b$)→DSS-K($1a$)→SP($1b$) of TEL-n] in FIG. 1 are shown in FIGS. 2, 3 and 4 respectively. FIG. 2 is a circuit diagram for the basic system and a calling tone sending circuit of this invention; FIG. 3 is a key service unit control circuit for providing a lamp display which is added to FIG. 2; and FIG. 4 is a circuit diagram of the key telephone set.

FIG. 2 shows a circuit diagram explanatory of control of this invention system. Reference numerals 1 and 27 indicate counters; 2 and 26 designate clock pulse generators; 3, 4, 28 and 62 identify decoders; 5, 10, 67 and 91 denote inverters; 8, 11, 14, 31, 71, 72, 54, 55, 60, 61, 75 and 86 represent AND gates; 7, 9, 12, 32, 56, 57, 76 and 81 show OR gates; 13, 58 and 59 refer to shift registers; 53 indicates an encoder; 68 designates a multivibrator; 69 identifies a sine wave generator for the sound source use; 65 and 66 denote analog gates; 77 and 78 represent transformers; 79 shows an amplifier; 80 refers to a speaker; 82, 83 and 84 indicate contacts of a calling key; 87 designates a contact which operates upon re-pression of a CO line key; 74 identifies a delay circuit; 36 denotes a hook switch; 33 and 34 represent contacts of a CO line selecting key; 35 shows a power source; 37, 88, 89 and 90 refer to cables; 40, 51, 52, 63, 64, 70, 73 and 85 indicate flip-flop circuits; + designates the plus side of the power source; E identifies the minus side of the power source; 1$a$ denotes a key service unit control circuit of the calling device; 2$a$ represents a subscriber circuit of a calling key telephone set, a plurality of subscriber circuits being connected in parallel to the control circuit 1$a$ via the OR gate 76; 1$b$ shows a calling circuit of a called key telephone set; 2$b$ refers to a calling device control circuit; and 3$b$ indicates a calling key telephone set control circuit.

For the actuation of the above circuits, let it be assumed that the counter 1 and 27 respectively count pulses from the clock pulse generators 2 and 26 and are synchronized with each other. Upon depressing the CO line key after off-hooking to make a call for the CO line, for instance, the contacts 33 and 36 make. As a consequence, a timing pulse $T_9'$ in the output signal from the decoder 28, which is driven by the output signal from the counter 27, is applied to the input terminal of the flip-flop 40 via a path [decoder 28→contact 33→OR gate 32→AND gate 31→cable 37→flip-flop 40]. Thus, a signal as for the CO line selection is provided from the key telephone set 3$b$ to the key service unit 2$a$, and this signal is received by the key service unit 2$a$ and stored in the shift register 13.

Figure 5:
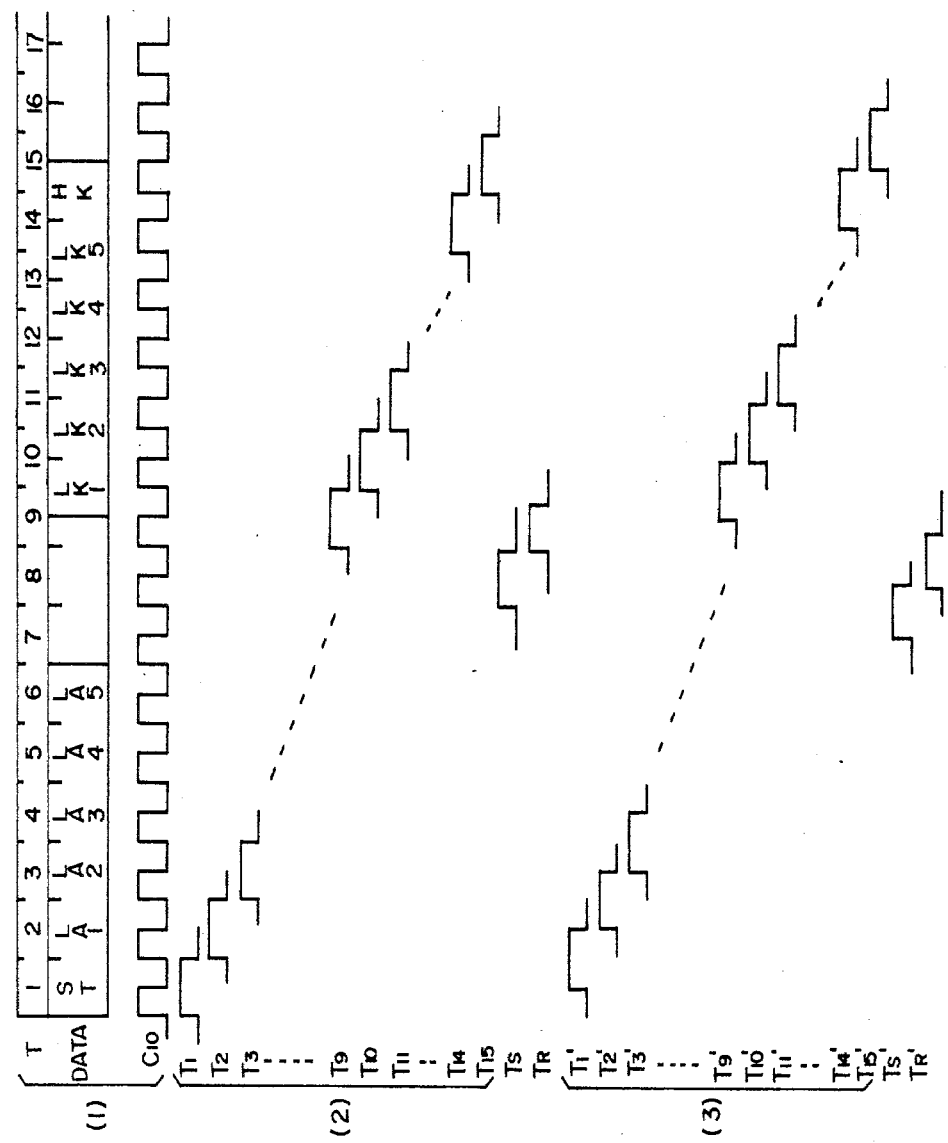
FIG. 5 is a timing chart explanatory of the operation of this invention.
Figure 5:
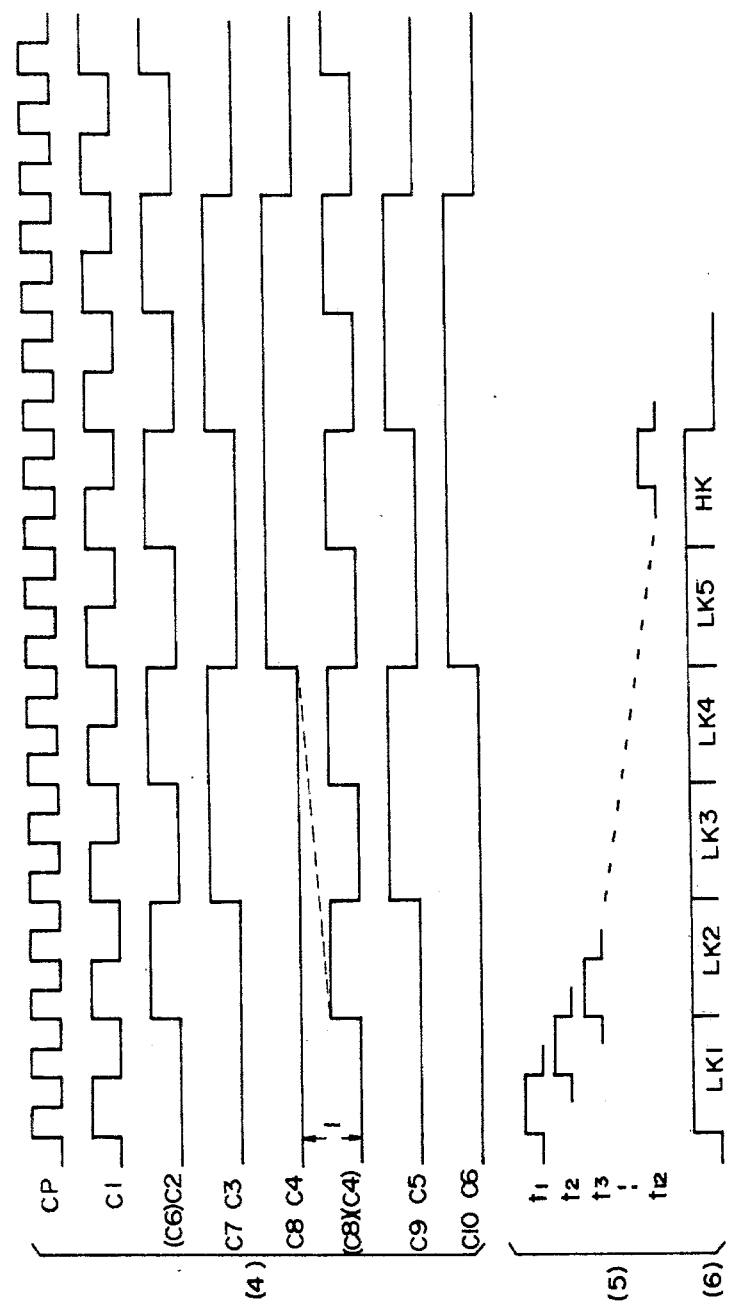

Now, a description will be given of the timing for input to the shift register 13. The counter 1 is composed of a plurality of cascade-connected binary counters and driven by a clock pulse train CP derived from the clock generator 2. The timing chart of outputs $C_1$ through $C_{10}$ from the counter 1 is shown in FIG. 5(4). Next, the decoders 3 and 4 are driven by the output from the counter 1 to provide outputs $t_1$ through $t_n$ and $T_1$ through $T_n$. The outputs $T_1$ through $T_n$ are signals whose pulse widths are each equal to the period of the output $C_{10}$ from the counter 1, as depicted in FIG. 5(2). The output $t_1$ through $t_n$ are signals whose pulse widths are each equal to the period of the pulse CP and sufficiently smaller than the pulse widths of the outputs $T_1$ through $T_n$, as shown in FIG. 5(5). Further, signals $T_1'$ through $T_n'$ from the key telephone set and the signals $T_1$ through $T_n$ bear such relationships as shown in FIGS. 5(2) and (3) and are synchronized with each other, with a certain delay held therebetween. FIG. 5(1) is a diagram showing the timing of data in a case of five CO lines, and in FIG. 5(1) reference characters $LK_1$ through $LK_5$ indicate signals for CO line keys respectively, and T designates the unit time which has a time slot corresponding to each of the signals $T_1$ through $T_n$.

As is evident from FIG. 5(1), the aforesaid signal $T_9'$ transmitted from the key telephone set to the key service unit is delayed for a certain period of time relative to the signal $T_9$. This delay is to correct step out between the counters 1 and 27 by receiving the transmitted signal in the vicinity of the center of its pulse width in the key service unit.

In FIG. 2, the flip-flop 40 is of the type which produces an output when the gate pulse $C_{10}$ rises. When supplied with the input signal $T_9'$, the flip-flop 40 provides an output in synchronism with the gate pulse $C_{10}$, which output is applied to one of input terminals of the AND gate 11. The output signal in this case is synchronized with the gate pulse $C_{10}$, which is derived from the counter 1. Next, the output from the shift register 13 flows in a path [output terminal of shift register 13→AND gate 14→OR gate 12→input terminal of shift register 13] to form a feedback loop, and the shift register 13 shifts with the clock pulse CP, and input information to the shift register 13 circulates therein with a constant period and is stored therein. For inputting the abovesaid signal to the shift register 13, a timing pulse is outputted from the OR gate 9 by a circuit composed of the AND gate 8 and the OR gate 7 and 9, and the output signal is provided via the inverter 10 to the AND gate 14 to close it. At the same time, the output signal is applied to the AND gate 11 to open it, permitting the signal applied thereto from the flip-flop 40 to be inputted to the shift register 13 via the OR gate 12. As this input timing is determined to $t_1$ and $t_2$ by the abovesaid operation, the storage location of the input signal in the shift register 13 is also fixed and the stored signal is outputted at the timings $t_1$ and $t_2$ after one period. For the synchronization of the input and the output of the shift register 13 with each other, the storage capacity of the shift register 13 is set to be identical with the step $t_1$ through $t_n$ of one period of the decoder 3. Thus, the CO line signal $T_9'$ applied from the key telephone set is converted to the timings $t_1$ and $t_2$ and provided via the OR gate 76 to one input terminal of each of the AND gates 54 and 55.

Next, the calling key of the calling device DSS-T (2$b$ in FIG. 2) is depressed to make its contact 82 for making a call under the abovesaid conditions, the contact 84 which is ganged with the contact 82 also makes. As a result of this, the timing pulse $T_2'$ in the output signal from the decoder 28, driven by the output signal from the counter 27, flows in a path [decoder 28→contact 82→OR gate 81→cable 88→flip-flop 51] to set the flip-flop 51 at the timing $T_3$, and its output is encoded by the encoder 53. The signal thus obtained in the encoder 53 is applied to the shift registers 58 and 59 in the following manner. That is, as is the case with the aforementioned storing operation of the flip-flop 40, the signal applied to the flip-flop 51 is derived at its output side and provided to one of input terminals of each of the AND gates 54 and 55. The output signal in this instance is synchronized with the signal $C_{10}$, which is derived from the counter 1. The outputs from the shift registers 58 and 59 flow in paths [output terminals of shift registers 58 and 59→AND gates 60 and 61→OR gates 56 and 57→input terminals of shift registers 58 and 59] to set up feedback loops. The shift registers 58 and 59 shift with the clock pulse CP, and the input information to these shift registers circulates with a constant period and are stored therein. For inputting the abovesaid signal to the shift registers 58 and 59, the timing pulse derived from the output side of the OR gate 76 is provided via the inverter 67 to the AND gates 60 and 61 to close them. At the same time, the abovesaid timing pulse is applied to the AND gates 54 and 55 to open them, by which the signal applied to the shift registers 58 and 59 via the OR gates 56 and 57 respectively. Since this input timing is determined by the above operation to the timings stored in the shift register 13, that is, $t_1$ and $t_2$, the signal storage locations in the shift registers 58 and 59 are also fixed, and the stored signals therein are outputted at the timings $t_1$ and $t_2$ after one period. To achieve synchronization between the shift registers 58 and 59 and the shift register 13, these shift registers are set to have the same storage capacity. Thus, the calling signal $T_2'$ applied from the calling device DSS-T is stored in the shift registers 58 and 59 at the same timings $t_1$ and $t_2$ as the CO line signals and in a code indicating individual information of the contact 84. The AND gates 54 and 55, the OR gates 56 and 57, the shift registers 58 and 59 and the AND gates 60 and 61 are respectively shown to be two in number but, in actual design, they are connected in parallel in required numbers.

Next, in the operations described above, while the contact 82 continues to make, the stored contents of the shift registers 58 and 59 are retained. But when this contact breaks, the contents of the shift registers 58 and 59 are erased. Then, it is necessary to provide means by which even if the contact 82 breaks, that is, even if the actuation of the calling key is stopped, calling is maintained and the contents of the shift registers 58 and 59 are erased upon answering from the called party. The following will described the construction and operation of this means.

This means is the circuit composed of the circuit elements 70, 71, 72, 73, 74, 91 and 75 in FIG. 2. Upon depression of one of calling keys in the calling device DSS-T, its contact 82 and the common contact 84 both make, and a timing pulse $T_S'$ in the output signal from the decoder 28, driven by the output signal from the counter 27, is provided to the input terminal of the flip-flop 70 via a path [decoder 28→contact 84→OR gate 81→cable 88→flip-flop 70] and set in the flip-flop 70 at the timing of the signal $C_{10}$, and the output therefrom is synchronized with a signal $T_S$. Accordingly, the output signal is applied to the AND gate 71, in which only the timing pulse $T_S$, that is, the timing pulse $T_S'$ is extracted, and the extracted timing pulse is applied to the flip-flop 73 to set it. The flip-flop output is delayed by the delay circuit 74 for a certain period of time and provided via the inverter 91 to one input terminal of the AND gate 75 to inhibit its output. As consequence, timing pulses for writing in the shift registers 58 and 59 are not inputted, so that no rewriting operation takes place. Consequently, even if the key actuation is the calling device DSS-T is ceased to break the contact 82 and hence alter the state of the flip-flop 51, information indicating it is not inputted to the shift registers 58 and 59, so that their contents circulate in the aforementioned circulating circuits and remain unchanged. By the above operation, calling is maintained even after the key actuation in the calling device DSS-T is stopped.

Though not illustrated in FIG. 2, the called key telephone set includes a circuit similar to the control circuit 3b, and the subscriber circuit SUB-n for the called key telephone set includes a circuit similar to the control circuit 2a. Further, since the output of the AND gate 75 of the control circuit 2a included in the subscriber circuit SUB-n is connected to one of input terminals of the OR gate 76, the output at the output terminal of the AND gate 75 included in the subscriber circuit SUB-n is applied to the abovesaid one input terminal of the OR gate 76 by the same operations as those described previously in connection with the transmission of the signal as for the CO line selection to the key service unit 2a from the key telephone set 3b in the subscriber circuit and the storing of the signal in the shift register 13. As a result of this, the shift registers 58 and 59 are rewritten by the aforesaid operations.

Thus, the calling is stopped.

Moreover, in the case of the calling party (the console attendant) stopping the calling before answering from the called party, the contact 87 of a key of the circuit 3b of the key telephone set TEL-1 is made, by which the flip-flop 85 is set, and its output is applied to the AND gate 86 to open it. Then, a timing pulse $T_R'$ is provided via a path [AND gate 86→OR gate 81→cable 88→flip-flop 70→AND gate 72] to a reset terminal of the flip-flop 73 to reset it, releasing the AND gate 75 from its output inhibited state. As a consequence, if the console attendant depresses the CO line, the shift register 58 and 59 are rewritten as described previously. Thus, the calling is stopped. In this case, if the calling key is depressed in the next calling, the contact 84 makes to pass on the timing signal $T_S'$ to the reset terminal of the flip-flop 85 to reset it.

The above has described the operations for writing in and rewriting of the shift registers 58 and 59. The following will describe operations of calling by a tone and indication utilizing the output signals from the shift registers 58 and 59.

A description will be made first of calling a tone. In FIG. 2, the circuits 62, 63, 64, 65, 66, 68, 69, 77, 78, 79, 80, 89 and 90 are related to this calling. The contents of the shift registers 58 and 59 stored therein, as set forth above, are derived at their output terminals and developed by the decoder 62, the output from which is fed to a set terminal of the flip-flop 63 to set it. By previously applying an output signal from the multivibrator 68 to a reset terminal of the flip-flop 63 and by presetting the flip-flop 63 so that its resetting takes precedence over its setting, the flip-flop derives at its output terminal an output signal synchronized with the multivibrator 68. This signal is applied to a gate terminal of the analog gate 65 to actuate it, applying an output signal from the sine wave oscillator 69 via path [sine wave oscillator 69→analog gate 65→transformer 77→cables 89 and 90→transformer 78→emplifier 79→speaker 80] to the speaker 80 to actuate it.

The above operation enables tone calling of individual key telephone sets.

The above description has been given in connection with the case where the contact 82 makes, but when another contact, for example, 83 makes, the analog gate 66, for instance, is opened and closed by the same operation as described above, actuating a speaker corresponding to the analog gate.

By the above operation, individual calling can be achieved, but in this case it is necessary to detect at which CO line the call terminates. This detection is effected by the circuit of FIG. 3. In FIG. 3, reference numeral 95 indicates a decoder; 96 and 97 designate D flip-flops; 98, 99, 101 and 102 identify AND gates; 100 denotes an OR gate; and 104 represents a multivibrator. In operation, output signals from the shift registers 58 and 59 in FIG. 2 are developed by the decoder 95 and applied to an input terminal of the flip-flop 96, and its output is provided to a gate (clock) terminal of the flip-flop 96 via a route [AND gate 102→OR gate 100], by which an output signal synchronized with the timing pulse $T_1$ is derived from the flip-flop 96 and provided to one input terminal of the AND gate 99. An output signal from the multivibrator 104 having an inherent period of 1 Hz, for example, is applied to the other input terminal of the AND gate 99, deriving at its output an output signal which is the product of the abovesaid signals.

The signal thus obtained is provided on the corresponding individual control line, for example, TEL1, and applied to the circuit of FIG. 4 which is connected to the control line TEL1. In FIG. 4, reference numerals 106 and 107 indicate AND gates; 105 designates a D flip-flop; 108 and 109 identify RS flip-flops; and 110 denotes an indicator. The abovesaid input signal is applied to a set terminal of the flip-flop 105 in the circuit of FIG. 4 to set it, and its output is applied to one input terminal of each of the AND gates 106 and 107. The output signal from the aforementioned decoder 28 is provided to the other input terminal of the AND gate 106 to produce an output at its output terminal, which output is applied to a set terminal of the flip-flop 108 to set it, and its output is provided to the indicator 110 to light it. Thus, it is possible to indicate incoming call to the individual CO line.

Figure 6:
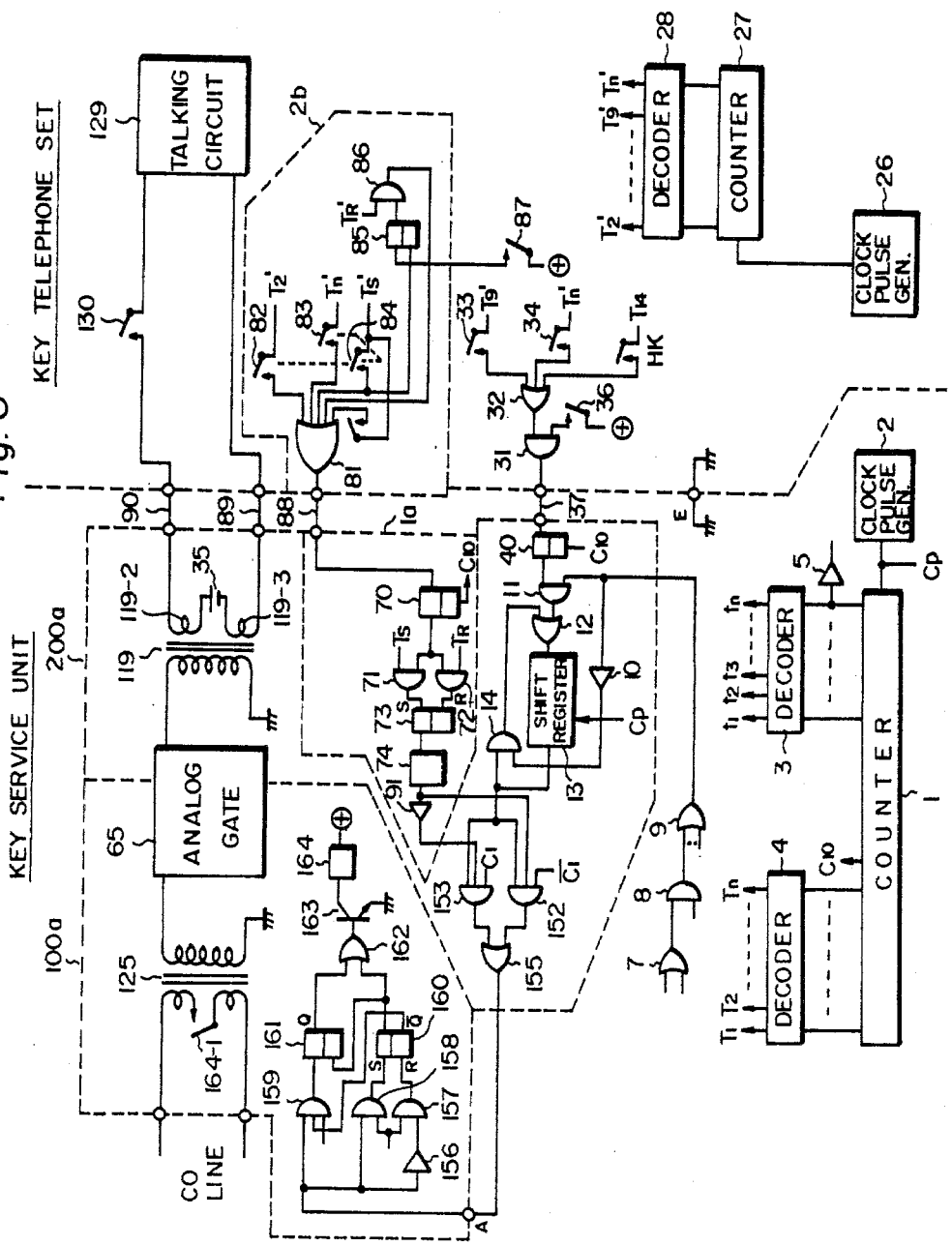
FIG. 6 is a block diagram showing a communication circuit system for use in this invention.

Turning next to FIG. 6, a description will be given with respect to CO line seizure in this invention. FIG. 6 differs from FIG. 2 in the omission of the circuit elements 51 through 69 and the OR gate 76 of the circuit 1a and the AND gate 75 of the circuit 2a and the circuit 1b in FIG. 2 and in the additional provision of a circuit 100a and circuit elements 119, 152, 153 and 155 in the circuit 2a and circuit elements 129 and 130 in the key telephone set. In FIG. 6, reference numeral 100a indicates a CO line circuit; 152, 153, 157 and 159 designate AND gates; 155 and 162 identify OR gates; 156 denotes an inverter; 160 and 161 represent flip-flops; 119 and 125 show transformers; 119-2 and 119-3 refer to secondary windings of the transformer 119; 129 indicates a talking circuit of the key telepyone set; 130 designates a hook switch is controlled in common to the hook switch 36; 163 identifies a transistor; 164 denotes a relay; and 164-1 represents its contact.

The application of CO line seizure information from the key telephone set to the shift register 13 for the CO line seizure is effected in the same manner as in the foregoing case.

The output derived from the AND gate 153 as a result of the above operation is provided via the OR gate 155 to the AND gate 158, which passes on only the output of the timing $t_1$ to the flip-flop 160 to set it. Where the input to the inverter 156 is low-level (which means no signal input thereto) at the timing $t_1$, the flip-flop 168 is reset. Consequently, the key 33 is held in its depressed state to continuously apply the repetitive pulse $T_9'$ from the key telephone set with the period of the counter 27, and only while the shift register 13 produces its output, the flip-flop 160 is retained in its set state and, upon cutting off of the abovesaid signal, the flip-flop is reset. Upon setting of the flip-flop 160, its output terminal becomes high-level and the output is applied via the OR gate 162 to the transistor 163 to turn ON its emitter-collector path, thereby actuating the relay 164 to make its contact 164-1.

Thus, a DC loop to the CO line is set up to seize the CO line. FIG. 6 illustrates the case of one CO line and one key telephone set, but by connecting a plurality of circuits 100a in parallel to the point A in FIG. 6 and by changing the input signal $t_1$ to the AND gates 157 and 158 to $t_1$, $t_3$, $t_5$, $t_7$, $t_9$, etc., many CO lines can be selectively seized from the key telephone set.

In the case of using many key telephone sets, the circuit 2a is connected in parallel to the point A in FIG. 6.

The above has described the CO line seizing operation and the following will describe the operation of holding the CO line by actuating the hold key in the calling device after the CO line is seized. The hold information from the calling device is sent out therefrom in the same manner as in the case of the CO line seizure information. Upon depression of the calling key in the abovesaid CO line seized state, its contacts 82 and 84 make, and the signal $T_S'$ from the decoder 28 is applied to the flip-flop 70 via the contact 84 and the same route as referred to previously. As a result of this, the output from the flip-flop 70 is fed to the delay circuit 74 in the same manner as described previously, and by the delayed output and the output from the shift register 13, the output of the logical product of the CO line seizure information of the timing $t_2$ and the timing pulse $\overline{C_1}$ of the counter 1, that is, the output from the AND gate 152 is provided via the OR gate 155 and the point A (a transfer bus) to the input of the AND gate 159. In the meantime, upon arrival of the hold information, the output from the AND gate 153 provided therefrom until then is inhibited by the inverter 156. As a consequence, the flip-flop 160 is reset to derive no output at the reset terminal R of the flip-flop 161. On the other hand, the flip-flop 160 provides an output at its output terminal $\overline{Q}$, and this output, the signal from the point A and the timing pulse $t_2$ are applied to the AND gate 159 to derive therefrom an output, which is applied to the flip-flop 161 to set it. The output Q from the flip-flop 161 is provided via the OR gate 162 to the transistor 163 to turn it ON, by which the relay 164 is driven to make its contact 164-1, thus holding the CO line.

The keys 33 and 34 of the key telephone set are those which are locked by the depression of a ganged key or a CO line key heretofore employed. That is, by the operation described above, the CO line is held, with the CO line key locked.

Next, in the case of answering again to the CO line, upon depression of a key for answering again provided in the key telephone set, its contact 87 makes to apply an input to the set terminal of the flip-flop 85 to set it, and the output therefrom is applied to one of input terminals of the AND gate 86. Accordingly, the output $T_R'$ from the decoder 28 is supplied via a path [decoder 28→AND gate 86→OR gate 81→cable 88→flip-flop 70] to the set terminal of the flip-flop 70 to set it. The flip-flop performs the same function as the flip-flop 40. Consequently, the flip-flop 70 produces an output at the same timing as the timing pulse $T_R$. The output from the flip-flop 70 is provided via the AND gate 72 to the reset terminal of the flip-flop 75 to reset it. As a result, the delay circuit 74 no more produces its output, and the AND gate 152 is closed, but the AND gate 153 is opened to provide the same condition as that of the CO line seizure, and the CO line is released from its held state and seized again. In this case, upon depression of the calling key to make the contact 84, the timing pulse $T_S'$ is applied via the contact 84 to the reset terminal of the flip-flop 85 to reset it.

If the contact 87 is so arranged as to be operated by re-depression of the CO line key, this contact 87 makes upon re-depression of the CO line key, and by the abovesaid operation, the flip-flop 73 is reset. In this instance, however, if the contact 33 makes first and then the contact 34 makes, the CO line seizure information by the contact 33 is cut off by breaking off the contact 33, so that the CO line is not seized again and the aforesaid CO line holding state is maintained. Then, by making the contact 33, the CO line can be seized again.

In this invention, when to hold a CO line, a CO line seize signal and a piece of hold information common to all CO lines are sent out as a CO line hold signal from a key telephone set and a calling device, respectively, and received with a register of a key service unit on a time shared basis, thereafter being converted to hold information for each CO line. The hold information is transmitted via transmission buses to CO line circuits on a time shared basis and selectively received with the CO line circuits to hold a desired one of the CO lines.

The above objective is achieved by providing a CO line holding circuit for a key telephone system adapted to selectively connect a plurality of key telephone sets to a plurality of CO lines through a key service unit and pluralities of talking lines and control lines and having a calling device provided in a particular one of the key telephone sets; in which the key service unit has a first pulse generator (1, 2, 4, 5) for generating click pulses, a plurality of modulation and demodulation high-speed time slot pulse trains one to one corresponding to the CO lines, a plurality of control signal transmitting low-speed time slot pulse trains one to one corresponding to the plurality of control lines, a CO line holding high-speed time slot pulse train and a CO line holding low-speed time slot pulse train, a plurality of memories (12, 13, 14) such as circulating memories each corresponding to one of the plurality of key telephone sets, a plurality of first write means (10, 11, 40) each provided corresponding to one of the plurality of key telephone sets for writing a CO line control output transmitted from the corresponding key telephone set via the control line in a corresponding one of the plurality of memories in synchronism with the AND output of a corresponding one of the plurality of control signal transmitting low-speed time slot pulse trains and a corresponding one of the plurality of modulation and demodulation high-speed time slot pulse trains, a plurality of first bistable circuits (160) respectively corresponding to the plurality of CO lines, a plurality of second bistable circuits (161) each provided corresponding to one of the plurality of first bistable circuits and reset by the output of a corresponding one of the first bistable circuits, a plurality of CO line closing means (162, 163, 164) each provided corresponding to one of the CO lines for forming a loop of the corresponding CO line when a corresponding one of the plurality of second bistable circuits is in a predetermined state, a plurality of first gate means (156, 157, 158) each provided corresponding to one of the CO lines for putting a corresponding one of the second bistable circuits in the predetermined state with an output read out of a corresponding one of the memories in the time slot of a designated one of the plurality of modulation and demodulation high-speed time slot pulse trains, a third bistable circuit (73) provided in correspondence to the calling device and supplied with a holding control output therefrom in synchronism with the AND output of the control signal transmitting low-speed time slot pulse train and the CO line holding high-speed time slot pulse train to be set in synchronism with the CO line holding low-speed time slot pulse train, a delay circuit (74) for delaying the output signal from the third bistable circuit for a certain period of time, third gate means (152, 153) provided in corresponding to the calling device for applying the content of a corresponding one of the plurality of circulating memories to a corresponding one of the plurality of first gate means in accordance with one state corresponding to the output from the delay circuit, and a plurality of second gate means (159) each provided corresponding to one of the plurality of CO lines for deriving an output from a corresponding one of the plurality of third gate means with a designated one of the modulation and demodulation high-speed time slot pulse trains to put a corresponding one of the plurality of second bistable circuits into the predetermined state with the output read out of the third gate means; in which the key telephone sets each have second pulse generator (26, 27, 28) for generating a synchronizing time slot pulse substantially synchronized with a corresponding one of the plurality of control signal transmitting low-speed time slot pulse trains and a CO line holding synchronizing time slot pulse trains substantially synchronized with the CO line holding low-speed time slot pulse trains, actuating means (33, 34) including a plurality of CO line selecting keys corresponding to the CO lines and one CO line holding key, and first control output means (31, 32) for deriving the CO line control output from a corresponding one of the key telephone sets with the AND output of the output from the actuating means and the synchronizing time slot pulse; in which a desired one of the plurality of key telephone sets is adapted so that one of the CO lines selected by the CO line control output sent out by the designating operation of the CO line selecting key is connected to the key telephone set on a time shared basis to enable talking with the CO line, the desired one of the key telephone set further having second actuating means (82, 83) including individual calling keys provided in the calling device respectively corresponding to the key telephone sets, a common contact (84) ganged with the actuating means, and second control output means (81) for deriving a control signal from the calling device with the AND output of outputs from the common contact and the second pulse generator; and in which one of the CO lines selected by the actuation of a selected one of the CO line selecting keys is formed into a loop in a desired one of the plurality of key telephone sets and held by the actuation of the CO line holding key.

As described above in detail, this invention enables automatic holding of a CO line by depressing a calling key to obviate in convenient operations in practical use and permit of miniaturization, curtailment of the cost and enhancement of performance of a key telephone system. Hence this invention is of great utility in practice.

Figure 7:
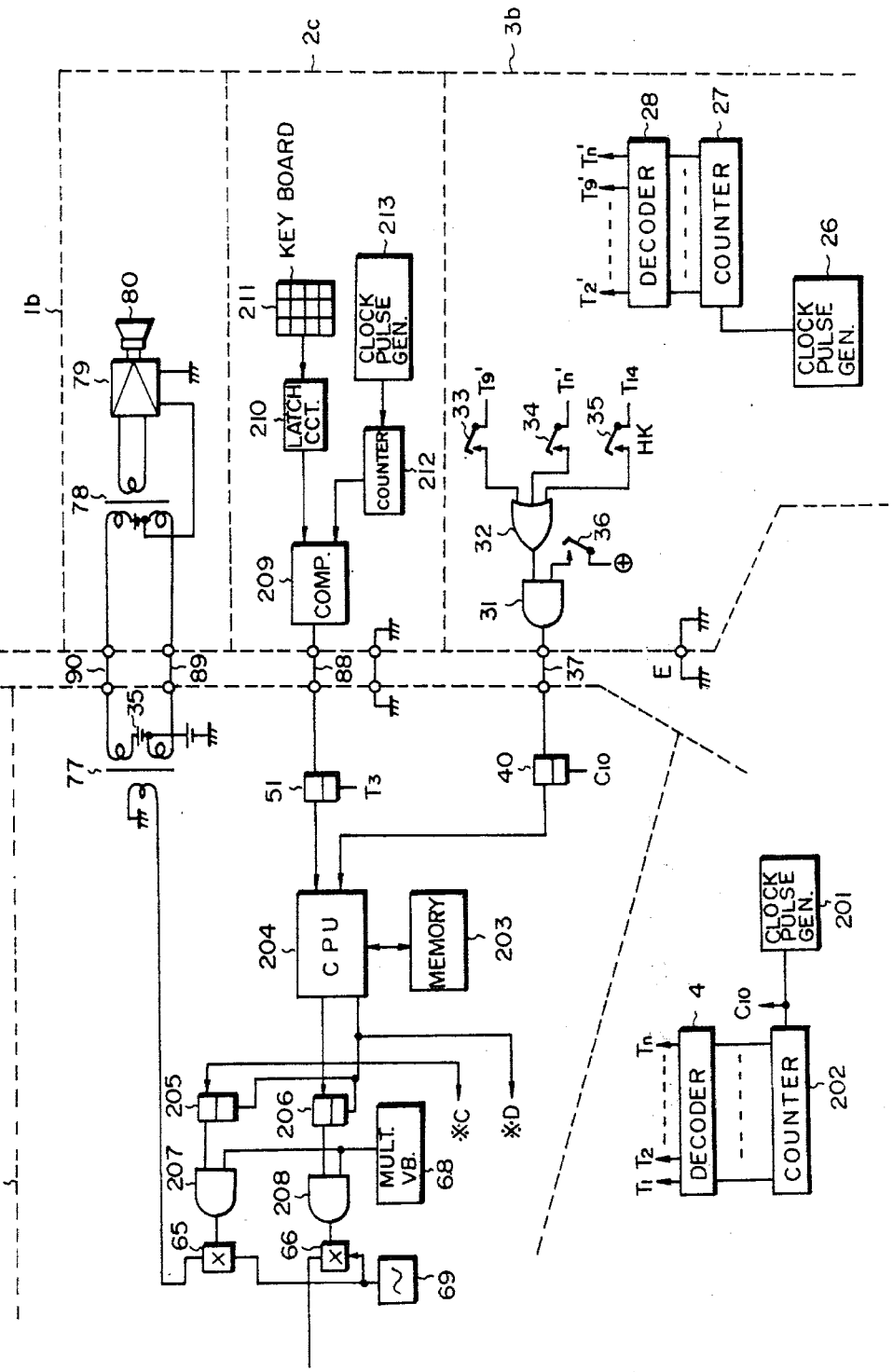

FIG. 2 illustrates an embodiment of this invention which employs a wired logic, but this invention is also possible with stored program control using CPU's. FIG. 7 shows an embodiment of the latter. A comparison of FIGS. 7 and 2 shows that FIG. 7 employs a central processing unit CPU and a memory having a plurality of memory areas corresponding to the calling device DDS-T and the key telephone sets TEL-1 through TEL-n in place of the memory composed of the shift registers 58 and 59 and the control circuit supplied with the signals from the circuit 3b of the calling key telephone set and the circuit 2b of the calling device, that is, the circuit composed of the circuit elements 7, 8, 9, 10, 11, 12, 13, 14, 53, 54, 55, 56, 57, 58, 59, 60, 61, 62, 71, 72, 73, 74, 75 and 76 in FIG. 2. Further, the circuit 2b of the calling device has the calling keys 82, 83 and 84 corresponding to the calling key telephone sets, but this can be replaced with a system in which calling information corresponding to a calling key telephone set is inputted by a keyboard switch commonly referred to as the ten-key and converted by a control circuit of the calling device to calling information corresponding to a called key telephone set, by which the same signal as that obtained in FIG. 2 is provided from the calling device to the aforesaid memory via the abovementioned central processing unit CPU provided in the key service unit.

The embodiment of FIG. 7 will hereinbelow be described in more detail. In FIG. 7, reference numerals 26, 201 and 213 indicate clock pulse generators, which are assumed to be of the same period and synchronized with one another; 202 and 212 designate counters; 203 identifies a memory; 204 denotes a central processing unit CPU; 205 and 206 represent D flip-flops; 207 and 208 show AND gates; 209 refers to a comparator; 210 indicates a latch circuit; and 211 designates a keyboard.

The operation of the embodiment of FIG. 7 is as follows. When the key telephone set is made off-hook and the key 33 is depressed in response to an incoming call signal, a CO line selecting signal is applied to the input terminal of the flip-flop 40, as described previously in respect of the operation of the embodiment of FIG. 2, and the output signal from the flip-flop 40 is provided to and processed by the central processing unit 204, thereafter being stored in an assigned area of the memory 203. Upon inputting an individual number for calling the called key telephone set 1b by the keyboard 211 of the circuit 2c of the calling device in the above state, the input signal is applied to a latch circuit comprised of the flip-flops 205 and 206 to set it, and its output is supplied to one input terminal of the comparator 209. The other input terminal of the comparator 209 has connected thereto the output terminal of the counter 212. When the state of the counter 212 is equal to the state of the latch circuit 210, the comparator 209 provides an output, and the output signal is the same as in the case of FIG. 2 and is provided via the cable 88 to the input terminal of the flip-flop 51 to set it, and its output is stored via the central processing unit 204 in an assigned area of the memory 203.

By the above operation, the content stored in the memory 203 is processed by the central processing unit 204, and its output information sets the flip-flop 205, the output from which is interrupted by the AND gate 207 with a period determined by the multivibrator 68, that is, turned ON and OFF, for example, for 1 and 3 seconds, respectively. The interrupted output is applied to the gate of the analog gate 65 to turn it ON and OFF. Thereafter, the speaker 80 is driven by the same operation as in the case of FIG. 2.

Figure 8:
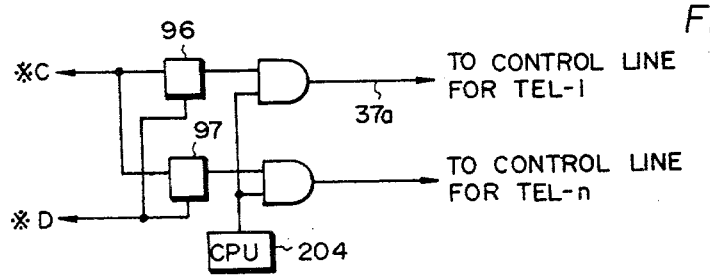
FIGS. 3 and 8 are block diagrams showing examples of a call control circuit for indication provided on the side of a key service unit in this invention.

The operation for providing a lamp indication in the key telephone set is substantially the same as in the case of FIG. 5, but the circuit construction therefor is such as shown in FIG. 8, and the flip-flop 96 is set by the output signal from the central processing unit 204. The subsequent operations are identical with those described previously; therefore no description will be repeated.

It is also possible to combine the circuits 1a and 2c of FIGS. 2 and 7 and the circuits 2b and 1c of FIGS. 2 and 7.

As described above, this invention resides in a calling system for a key telephone system adapted to selectively connect a plurality of key telephone sets to a plurality of CO lines through a key service unit and pluralities of talking lines and control lines. The plurality of key telephone sets each have a plurality of CO line selecting switches (33, 34) respectively corresponding to the CO lines, and at least one of the plurality of key telephone sets has a calling device (DSS-T, 2b) which is provided with a plurality of calling switches (82, 84) respectively corresponding to the plurality of key telephone sets. The key service unit has a plurality of first memories (13) respectively corresponding to the plurality of key telephone sets and at least one second memory (58, 59) corresponding to the calling device. In case of receiving an incoming call from a CO line, one of the plurality of CO line selecting switches which corresponds to the CO line is depressed to store information indicative of the selected CO line in the first memory. When it is desired to transfer the incoming call after answering it, one of the plurality of calling switches which is indicative of a called one of the key telephone sets is depressed to store information indicative of the called key telephone set in the second memory. The stored contents of the first and the second memory are read out thereof and transmitted to the called key telephone set to indicate therein its called state and the selected CO line.

In concrete terms, this invention is to provide a calling system for a key telephone system adapted to selectively connect a plurality of key telephone sets to a plurality of CO lines through a key service and pluralities of talking lines and control lines. The key service unit is provided with a first pulse generator (1, 2, 3, 4) for generating clock pulses, a plurality of high-speed time slot pulse trains respectively corresponding to the CO lines and a plurality of control signal transmitting low-speed time slot pulse trains respectively corresponding to the control lines, a plurality of first circulating memories (13) respectively corresponding to the plurality of key telephone sets and a plurality of first write means (7, 8, 9, 10, 11, 40) each provided corresponding to one of the key telephone sets for writing a control output transmitted via the control line (37) from the corresponding key telephone set in a corresponding one of the plurality of first circulating memories in synchronism with the plurality of control signal transmitting low-speed time slot pulse trains. The plurality of key telephone sets each have a second pulse generator (26, 27, 28) for generating synchronizing time slot pulse train substantially synchronized with a corresponding one of the plurality of control signal transmitting low-speed time slot pulse trains, first actuating means (33, 34) including a plurality of CO line selecting keys respectively corresponding to the CO lines and control output means (31, 32) for producing a control output from deriving the aforesaid control output from the abovementioned corresponding key telephone set by an AND output of the output from the first actuating means and the synchronizing time slot pulse train. Thus, in a desired one of the key telephone sets, one of the CO lines, which is selected by the abovesaid control output sent out by the selecting operation of the CO line selecting key, is connected to this key telephone set on a time shared basis to enable talking with the selected CO line. A calling device (DSS-T, 2b) provided in a particular one of the plurality of key telephone sets has second actuating means (82, 83) including a plurality of calling keys provided respectively in correspondence to the key telephone sets for individual calling and control output means (81) for deriving a call control signal from the calling device by an AND output of the output from the second actuating means and the synchronizing time slot pulse train. The control output means (81) and the key service unit are interconnected through a second control line (88). The key service unit it further provided with second circulating memories (58, 59) corresponding to the calling device and second write means (70, 71, 72, 73, 74, 75, 76, 91) for reading the output signal from the first circulating memory so as to write the call control signal transmitted via the second control line (88) from the calling device in a corresponding one of the plurality of second circulating memories (58, 59) in synchronism with the plurality of control signal transmitting low-speed time slot pulse trains. In the key service unit, a call signal transmitted from the calling device is encoded and then stored by the second write means in the second circulating memory, the output from which is decoded by a decoder (62). A gate circuit (65, 77) controlled by the decoded output is inserted between a ringer 69 and communication lines (89, 90) to apply via the communication lines the output signal from the ringer to a speaker circuit (78, 79, 80) to actuate a speaker.

Moreover, in the key service unit there is provided converting means (96, 97, 100, 101, 102) for decoding the output from the second circulating memory by a decoder (95) and converting the decoded output to a pulse train synchronized with the low-speed time slot pulse train, and the converted output is provided to indicating means (106, 107, 108, 109, 110) of the called key telephone set via a first control line (37a) corresponding thereto, by which an indication can be produced.

Further, in the calling device there are provided a common contact (84) ganged with the second actuating means and the second control output means (81) for deriving a control signal from the calling device by an AND output of outputs from the common contact and the control signal transmitting low-speed time slot pulse. The second control output means is connected via the second control line (88). In the key service unit there are further provided a bistable circuit (73) corresponding to the calling device and second gate means (75) controlled by the output from the bistable circuit and connected to the output of the second circulating memory. By the control signal transmitted via the second control line (88) from the calling device, the bistable circuit (73) is set to control the second gate means, by which it is possible to control whether the output signal from the first circulating memory is sent out or not.

As described above, this invention is a system adapted to concentratedly answer incoming calls in a key telephone system, and by enabling calling ganged with answering to an incoming call from a CO line, the CO line can be easily transferred to another key telephone set, thereby to improve the working efficiency of an operator. In addition, such a system can be obtained at low cost.

This invention also relates to a talking system for a key telephone system which is adapted for selective connection of a plurality of key telephone sets to a plurality of CO lines or intercomm. lines by the use of a key service unit and pluralities of communication lines and control lines.

Figure 9:
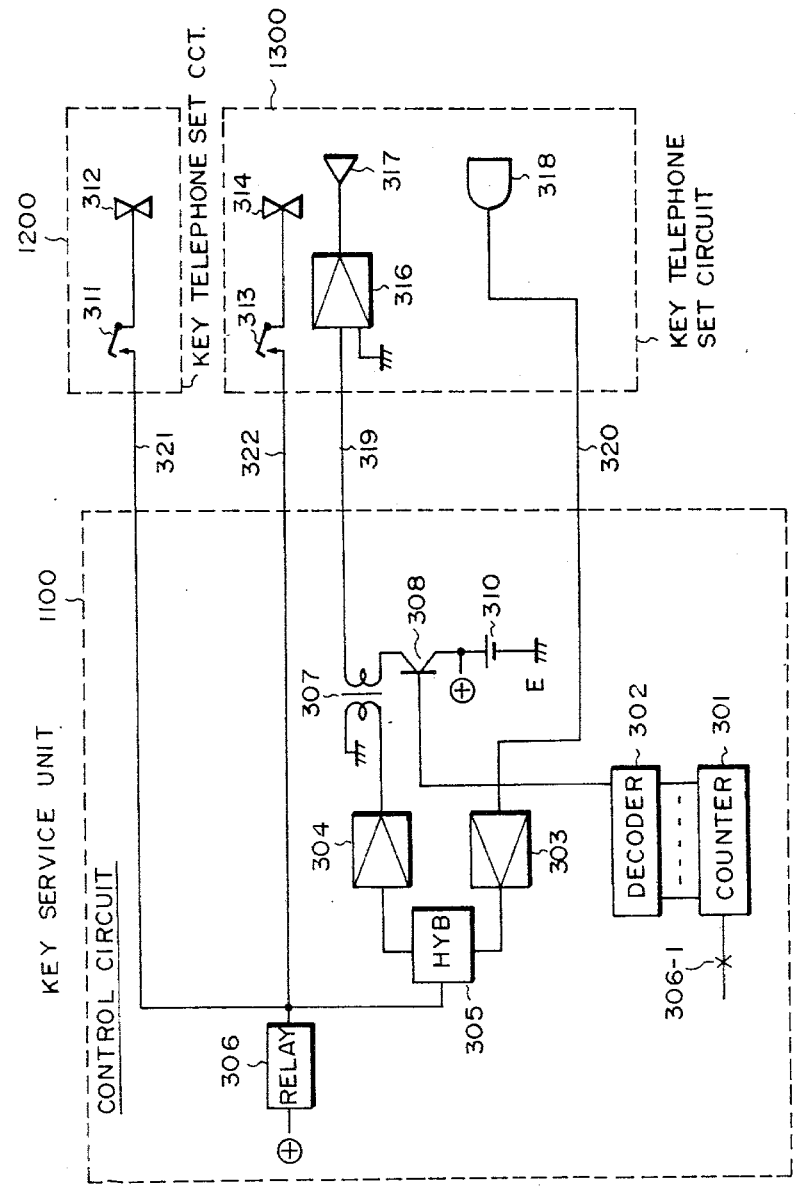
FIG. 9 is a circuit diagram showing an example of the prior art related to this invention.

A circuit system such, for example, as shown in FIG. 9 has heretofore been employed for hand-free answering and talking in intercomm. calling in a key telephone system. In FIG. 9, reference numeral 301 indicates a counter; 302 designates a decoder; 303, 304 and 316 identify amplifiers; 305 denotes a hybrid circuit; 306 represents a relay; 306-1 shows its contact; 307 refers to a transformer; 308 indicates a transistor; 310 designates a power source; 311 and 313 identify hook switch contacts; 312 and 314 denote talking circuits of key telephone sets; 317 represents a speaker; 318 shows a microphone; 319, 320, 321 and 322 refer to cables; 1100 indicates a key service unit control circuit; 1200 designates a calling key telephone set circuit; and 1300 identifies a called key telephone set circuit. In the circuit of FIG. 9, upon dialling after off-hooking of the calling key telephone set 1200, a dial pulse actuates the relay 306 to make and break the contact 306-1, and its state is counted by the counter 301. The count value of the counter is developed by the decoder 302 and an output signal at its particular output terminal is applied to the base of the transistor 308 to turn it ON. As a result of this, a speech sending signal from the calling key telephone set 1200 flows via a path [talking circuit 312→hook switch 311→cable 321→hybrid circuit 305→amplifier 304→transformer 37] to the transformer 307 to excite its primary winding to induce a signal in its secondary winding, whose induced output is applied to the input terminal of the amplifier 316 via a path [secondary winding of transformer 307→cable 319→earth E→power source 310→transistor 308→secondary winding of transformer 307] and amplified by the amplifier 316, thereafter being provided to the speaker 317 to actuate it. A speech sending signal from the key telephone set 1300 is transmitted via a path [microphone 318→cable 320→amplifier 303→hybrid circuit 305→cable 321→hook switch 311→talking circuit 312]. By the above operations, talking is enabled via a handset in the key telephone set 1200 and via the speaker 307 and the microphone 318 in the key telephone set 1300. With this method, however, there have been encountered such defects that the cable 320 is required for the microphone signal transmission use and that during speech sending, the counter 301 is seized and hence cannot respond to other originating calls.

Moreover, the conventional key telephone system has employed a cable with many conductors for interconnecting the key service unit and each key telephone set. However, recent trends of large and multi-functional systems and increasing material and labor costs have raised the cost of system construction. Accordingly, the reduction of the number of cable conductors offers an effective solution for the problem of cutting costs. For the reduction of the number of cable conductors, it is customary in the art to transfer the CO line or like line switching function from the present key telephone set to the key service unit, as is usually seen in an exchange or the like. But this heretofore employed method has the defect of the key service unit becoming bulky and expensive.

With reference to the drawings, another embodiment of this invention will hereinafter be described in detail.

Figure 10:
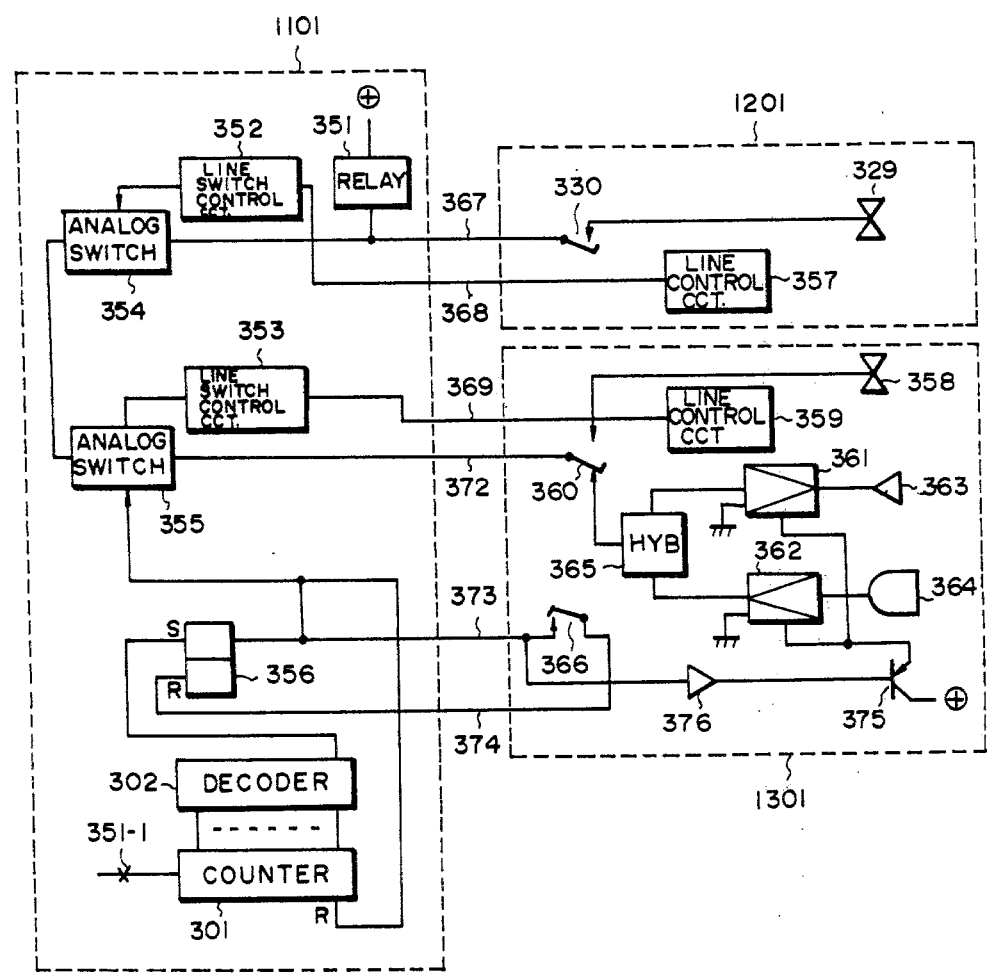
FIG. 10 is a block diagram illustrating an embodiment of this invention.

FIG. 10 illustrates an embodiment of this invention. Reference numeral 301 indicates a counter; 302 designates a decoder; 351 identifies a relay; 351-1 denotes its contact; 330, 360 and 366 represent hook switch contacts; 329 and 358 refer to talking circuits (including a dial) of a key telephone set; 361 and 362 indicate amplifiers; 363 designates a speaker; 364 identifies a microphone; 365 denotes a hybrid circuit, 367, 368, 369, 372, 373 and 374 represent cables; 356 shows a flip-flop; 354 and 355 refer to analog switches (thyristors or the like), each corresponding to one of key telephone sets; 352 and 353 indicate line switch control circuits, each composed of a shift register or the like and corresponding to one of the key telephone sets; 357 and 359 designate line control circuits; 375 identifies a transistor; 376 denotes an inverter 1101 represents a key service unit; 1201 shows a calling key telephone set; and 301 refers to a called key telephone set.

In the operation of the embodiment of FIG. 10, the line control circuit 357 including a key or like means is actuated by manipulating the means to transmit its output signal via the cable 368 to the key service unit 1101 for input to the line switch control circuit 352, the output from which is provided to the analog switch 354 to open and close it. Accordingly, when the calling key telephone set 1201 is off-hooked and the key of the abovesaid line control circuit, the analog switch 354 is closed via the abovesaid route. Next, upon dialing in the calling key telephone set 1201, dial impulses actuate the relay 351 via a path [talking circuit 329→hook switch contact 330→cable 367→relay 351] to make and break the relay contact 351-1, and the dial impulses are counted by the counter 301. The count value is developed by the decoder 302 and an output at a particular one of its output terminal is applied to a set terminal of the flip-flop 356, the output from which is provided to a gate terminal of the analog gate 355 to close it. As a consequence, a speech sending signal from the calling key telephone set 1201 drives the speaker 363 via a path [talking circuit 29→hook switch contact 330→cable 367→analog switch 354→analog switch 355→cable 372→hook switch contact 360→hybrid circuit 365→amplifier 361→speaker 363]. A speech sending signal from the called key telephone set 1301 is transmitted in a hand-free talking manner via a path [microphone 364→amplifier 362→hybrid circuit 365→hook switch contact 360→cable 372→analog switch 355→analog switch 354→cable 367→hook switch contact 330→talking circuit 329] and received by a receiver of the calling key telephone set 1201.

The output from the flip-flop 356 is applied to a reset terminal R of the counter 301 to reset it. As a result of this, the counter 301 can be made ready for the next dialling. Even when the counter 301 is thus reset, the abovesaid talking state is retained by the flip-flop 356.

Next, when the called party has taken up the handset after depressing the key included in the line control circuit 359 for switching hand-free talking to handset-talking, the output signal from the flip-flop 356 is applied via a path [cable 373→hook switch contact 366→cable 374→reset terminal of the flip-flop 356] to the reset terminal of the flip-flop 356 to reset it.

In this case, the analog switch 355 provides, as is the case with the calling key telephone set 1201, the output signal from the line control circuit 359 via the cable 369 to the line switch control circuit 353, the output from which is applied to the gate of the analog switch 355 to close it. As a consequence, talking by the handset between the calling and called key telephone sets 1201 and 1301 is enabled via a path [talking circuit 329→hook switch contact 330→cable 367→analog switch 354→analog switch 355→hook switch contact 360→talking circuit 358].

Figure 11:
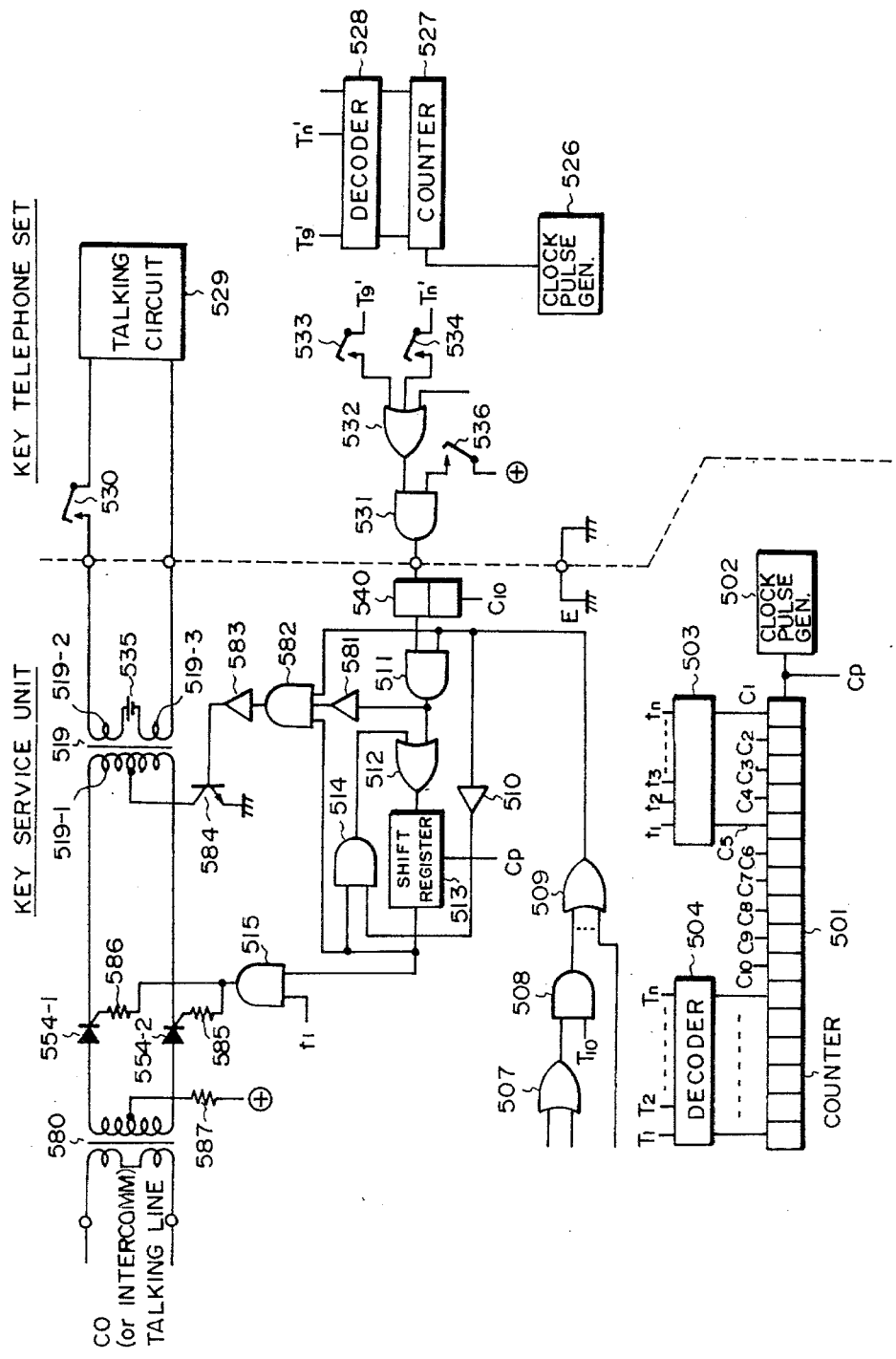
FIGS. 11 and 15 are circuit diagrams showing specific operative examples of line control in the embodiment of FIG. 10.

The above is the entire operation of this invention. With reference to FIG. 11, a detailed description will be given of the structure [357→368→352→354] or 359→369→353→355] in FIG. 10 and its operation.

FIG. 11 shows a talking control system employing thyristors as the aforesaid analog switches. In FIG. 10, reference numerals 501 and 527 indicate counters; 502 and 526 designate clock pulse generators; 503, 504 and 528 identify decoders; 510, 581 and 583 denote inverters; 508, 511, 514, 515 and 531 represent AND gates; 507, 509, 512 and 532 show OR gates; 513 refers to a shift register; 519 and 580 indicate transformers; 529 designates a key telephone set circuit; 530 and 536 identify hook switches; 533 and 534 denote CO line (or intercomm. line) selecting key contacts; 535 represents a power source; 540 shows a flip-flop; + refers to the plus side of the power source; E indicates the minus side of the power source; 584 designates a transistor; 554-1 and 554-2 identify thyristors; and 585, 586 and 587 denote resistors. The operation of the above circuit starts with counting of output pulses from the clock pulse generators 502 and 527 by the counters 501 and 527, respectively. Let it be assumed that the output pulses from the both clock pulse generators are synchronized with each other. Upon depression of the CO line selecting key after taking off the handset to make a call for the CO line, the contacts 533 and 534 make. As a consequence, a timing pulse $T_9'$, which is one of output signals from the decoder 528 driven by the output signal from the counter 527, is provided to an input terminal of the flip-flop 540 via a path [decoder 528→contact 533→OR gate 532→AND gate 531→flip-flop 540]. Thus, a signal for selecting the CO line (or intercomm. line) is applied from the key telephone set to the key service unit. The signal thus applied is received by the key service unit and stored in the shift register 513.

Figure 12:
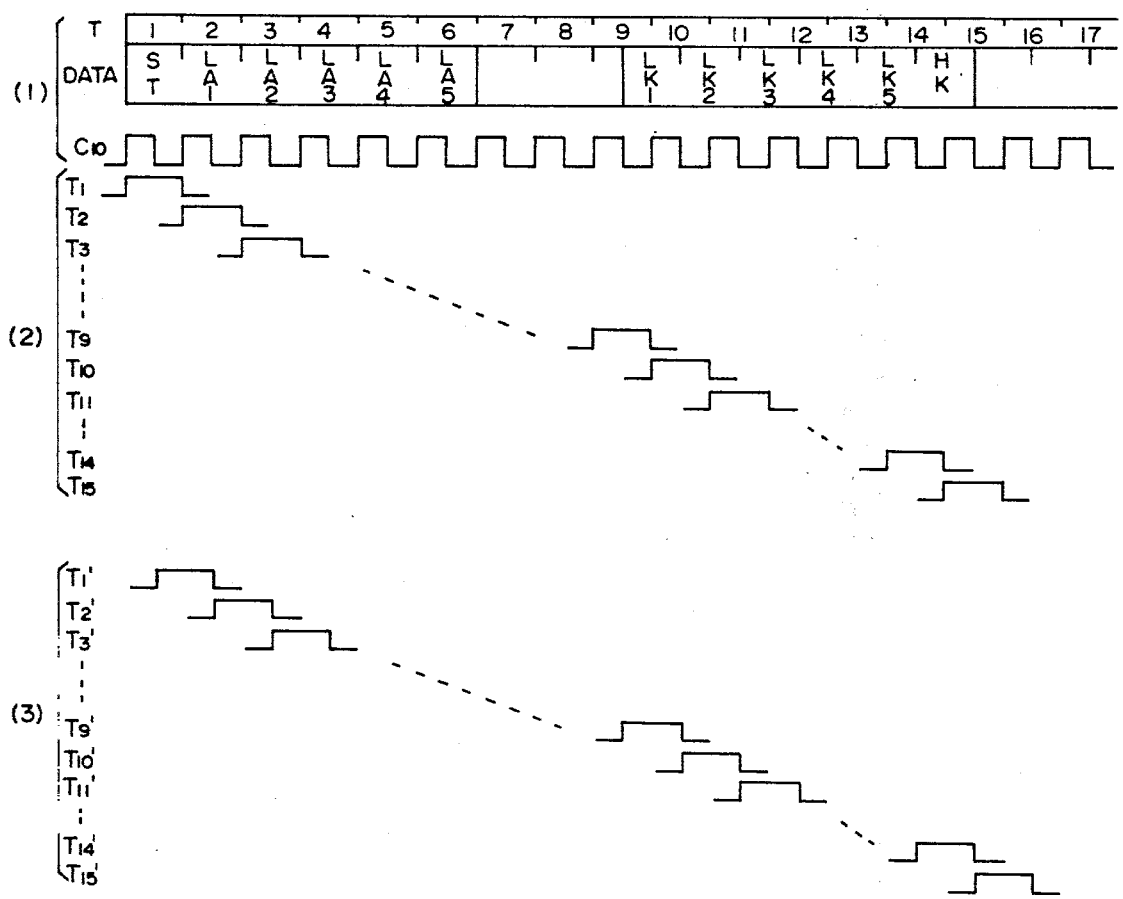
FIG. 12 is a timing chart explanatory of the operation of the example shown in FIG. 11.
Figure 12:
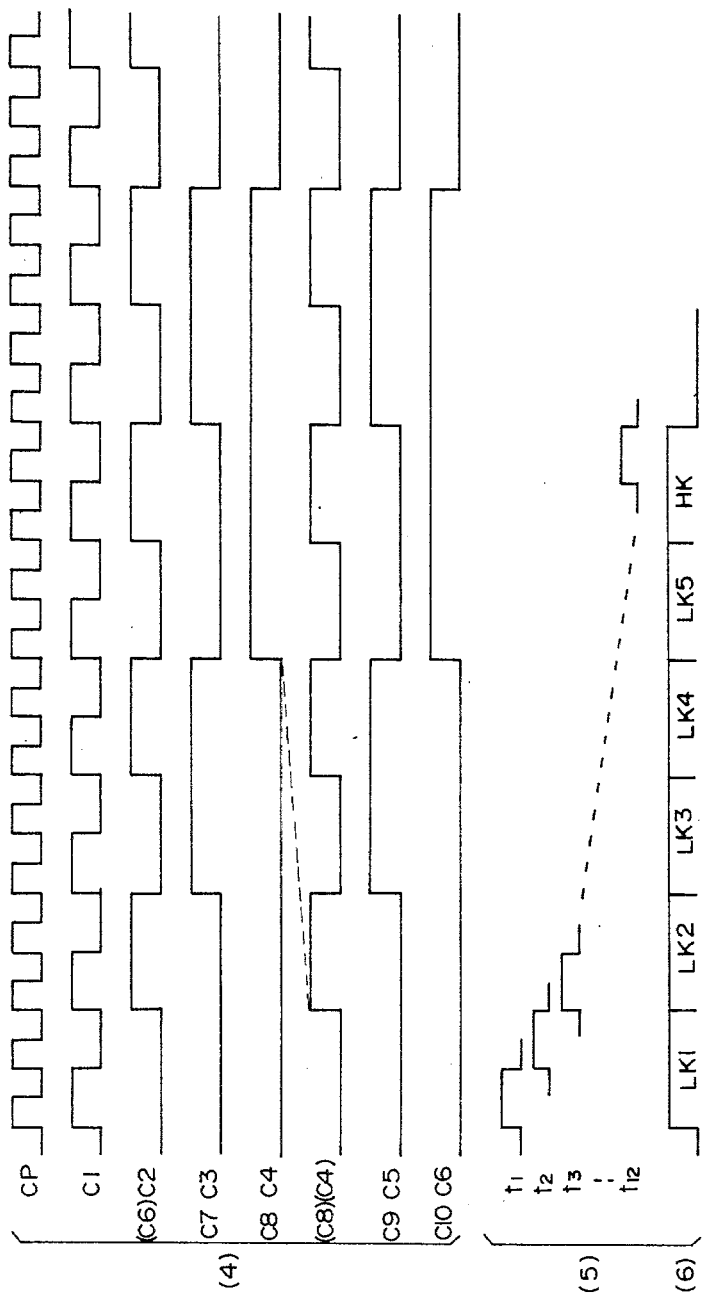

Now, a description will be made of the timing for input to the shift register 513. The counter 501 is composed of a plurality of cascade-connected binary counters and driven by a clock pulse train CP from the clock pulse generator 502. A timing chart of outputs $C_1$ to $C_{10}$ from the counter 502 is shown in FIG. 12(4). Next, the decoders 503 and 504 are driven by the output from the counter 501 to obtain decoder outputs $t_1$ to $t_n$ and $T_1$ to $T_n$. The outputs $T_1$ to $T_n$ are signals whose pulse widths are each equal to the period of the output $C_{10}$ from the counter 501, as shown in FIG. 12(2). The output $t_1$ to $t_n$ are signals whose pulse widths are each equal to the period of the output CP but sufficiently smaller than the pulse width of each of the outputs $T_1'$ to $T_n'$, as shown in FIG. 12(5). Further, signals $T_1'$ to $T_n'$ from the key telephone set and the signals $T_1$ to $T_n$ bear such relationships to each other as shown in FIGS. 12(2) and (3); they are synchronized with each other, with a certain time lag held therebetween. FIG. 12(1) shows the timing of data in a case of five CO lines, reference characters $LK_1$ through $LK_5$ indicating signals for CO line selecting keys, respectively, and T the unit time which has a time slot corresponding to each of the signals $T_1$ to $T_n$. As is evident from FIG. 12, the aforesaid signal $T_9'$ transmitted from the key telephone set to the key service unit is delayed for a certain period of time relative to the signal $T_9$. This delay is to correct step out between the counters 501 and 527 by receiving the transmitted signal in the vicinity of the center of its pulse width in the key service unit.

In FIG. 11, the flip-flop 540 is of the type which produces an output when the gate pulse $C_{10}$ rises. When supplied with the input signal $T_9'$, the flip-flop 540 provides an output in synchronism with the gate pulse $C_{10}$, which output is applied to one of input terminals of the AND gate 511. The output signal in this case is synchronized with the gate pulse $C_{10}$, which is derived from the counter 501. Next, the output from the shift register 513 flows in a path [output terminal of shift register 513→AND gate 514→OR gate 512→input terminal of shift register 513] to form an feedback loop and the shift register 513 shifts with the clock pulse CP, and input information to the shift register 513 circulates therein with a constant period and is stored therein. For inputting the abovesaid signal to the shift register 513, a timing pulse is outputted from the OR gate 509 by a circuit composed of the AND gate 508 and the OR gates 517 and 509, and the output signal is provided via the inverter 510 to the AND gate 514 to close it. At the same time, the output signal is applied to the AND gate 511 to open it, permitting the signal applied thereto from the flip-flop 540 to be inputted to the shift register 513 via the OR gate 512. As this input t-iming is determined to $t_1$ and $t_2$ by the abovesaid operation, the storage location of the input signal in the shift register 513 is also fixed and the stored signal is outputted at the timings $t_1$ and $t_2$ after one period. For the synchronization of the input and the output of the shift register 513 with each other, the storage capacity of the shift register 513 is set to be identical with the steps $t_1$ through $t_n$ of one period of the decoder 503. Thus, the CO line signal $T_9'$ applied from the key telephone set is converted to the timings $t_1$ and $t_2$, which are applied to the AND gate 515, in which only $t_1$ is picked up by a pulse of the timing of the signal $C_1$. The output from the AND gate 515 is applied via the resistors 585 and 586 to gate terminals of the thyristors 554-1 and 554-2 to turn them ON. Accordingly, a DC current flows between the anode and the cathode of each thyristor via a path [power source +→resistor 587→right-hand winding of transformer 580→thyristor 554-1 (or 554-2)→left-hand winding 519-1 of transformer 519→collector-emitter path of transistor 584→earth E] to hold the thyristors 554-1 and 554-2 in their ON state, and an AC signal induced in the transformer 580 is transmitted to the transformer 519.

Next, when the key is depressed again, for example, when the key 533 breaks, the input and output states of the shift register 513 change. That is, the signal from the key telephone set is cut off, but since the shift register 513 has stored therein the signals corresponding to the state of the key 533 by one period, the outputs from the AND gate 511 and the shift register 513 become low-level and high-level, respectively, in the time slots ($K_1$ and $K_2$ in this case) corresponding to them. This state is detected by the AND gate 582, whose output is provided via the inverter 583 to the base of the transistor 584. When no input is applied, the inverter 583 provides at its output terminal a high-level output, but when a pulse is applied to the inverter 583, its output becomes low-level, that is, a ground potential. As a result of this, when the abovesaid pulse exists, the collector-emitter path of the transistor 584 is in the OFF state to cut off the aforesaid DC loop current flowing in the thyristors 554-1 and 554-2, turning OFF these thyristors.

With the above operation, the line switches (thyristor switches) loaded in the key service unit can be controlled by the line control key, that is, the CO line (or intercomm. line) selecting key loaded in the key telephone set.

The above operation has been described in connection with the operation in a case of re-pressing the key, but even if an unexpected external noise or the like is mixed into the aforesaid control circuit to close a wrong line switch, since such a signal is not continuous, the same operation as described above takes plate to turn OFF the transistor 584 in a moment to put the thyristor in the OFF state. In other words, an error detection is achieved, and even if a wrong line switch is closed, it is opened after one period, and by setting the period of the aforementioned write control signal sufficiently short, this momentary false connection does not matter in practical use.

The embodiment of FIG. 11 has been described in respect of the case of using thyristors as the analog switches 354 and 355 employed in FIG. 10, but the same results as those described above can also be obtained with such a construction in which transistors are used in place of the thyristors and a flip-flop circuit serving as the memory circuit for seizing a CO line selecting signal is inserted between the bases of the transistors and output terminals of the line switch control circuits 352 and 353.

In FIGS. 10 and 11, by branching a reset signal for the flip-flop 356 from the cable 374 to apply it as an OR input to the inverter 583 in FIG. 11 during answering with the handset of the key telephone set 1301, it is possible to turn OFF the collector-emitter path of the transistor 584 in a moment to switch OFF the thyristors in the same manner as in the aforesaid case of repressing the CO line (or intercomm. line) key. Moreover, in FIG. 10, if a timer which produces an output signal a certain period of time after setting of the flip-flop 356 is connected in parallel to its reset terminal R, calling can be halted a certain period of time after starting of the aforesaid hand-free calling.

Next, the above description has been given on the assumption that the amplifiers 361 and 362 are already connected to the power source, but it is effective from the viewpoints of power consumption and noise suppression to connect the power source to the amplifiers upon application of a calling signal. To perform this, for example, as shown in FIG. 10, the transistor switch 375 is connected to power source input terminals of the amplifiers 361 and 362, and the output signal from the flip-flop 356 is provided to the base of the transistor 375 via a path [flip-flop 356→cable 373→inverter 376→base of transistor 375]. When the output from the flip-flop 356 is high-level, base potential of the transistor 375 is made equal to the groud potential to turn ON its collector-emitter path to connect the power source to the amplifiers 361 and 362 via a path [power source +→collector-emitter path of transistor 375→power source terminals of amplifiers 361 and 362→ground]. When the output from the flip-flop 356 is low-level, the collector-emitter path of the transistor 375 is turned OFF in the abovesaid route to disconnect the amplifiers 361 and 362 from the power source. By the above operation, the power source can be connected to the amplifiers 361 and 362 upon calling.

In FIG. 10, the cables 373 and 374 can be used in comm to the cable 369 and omitted by using the system employed in FIG. 11, that is, the time-division transmission system.

FIG. 11 shows the case of one CO line (or intercomm. line) and one key telephone set, and in a case of pluralities of CO lines (or intercomm. lines) and key telephone sets, a matrix circuit is formed which is composed of thyristor switches equal in number to the product of the numbers of CO line (or intercomm. lines) and key telephone sets used.

Figure 13:
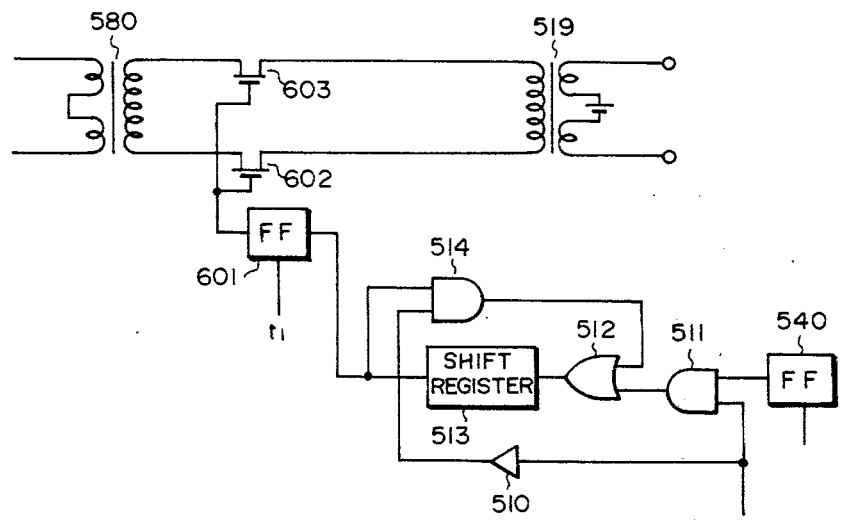
FIGS. 13 and 14 are circuit diagrams illustrating modified forms of the specific example of FIG. 11.

The embodiment of FIG. 11 employs thyristors as the line switches, but FIG. 13 shows an example in which the thyristors are replaced with a combination of an analog switch such as a transistor switch and a storage element such as a D flip-flop. In this case, only when the gate 515 in FIG. 11 provides an output signal, the D flip-flop is set, and the analog switch is closed by the output from the D flip-flop, thereby setting up a speech path. Accordingly, the example of FIG. 13 dispenses with the output signal from the gate 582 in FIG. 11.

In FIG. 13, reference numeral 601 indicates a D flip-flop, and 602 and 603 designate transistors. By the same operation as in the case of FIG. 11, the shift register 513 provides an output, which is applied to a signal input terminal of the D flip-flop 601. And, by the application of a signal of the time slot $K_1$ to its clock terminal, the D flip-flop 601 is set, and its output signal is supplied to the gates of the transistors 602 and 603 to turn them ON. Thus, a speech path is established as is the case with FIG. 11.

Figure 14:
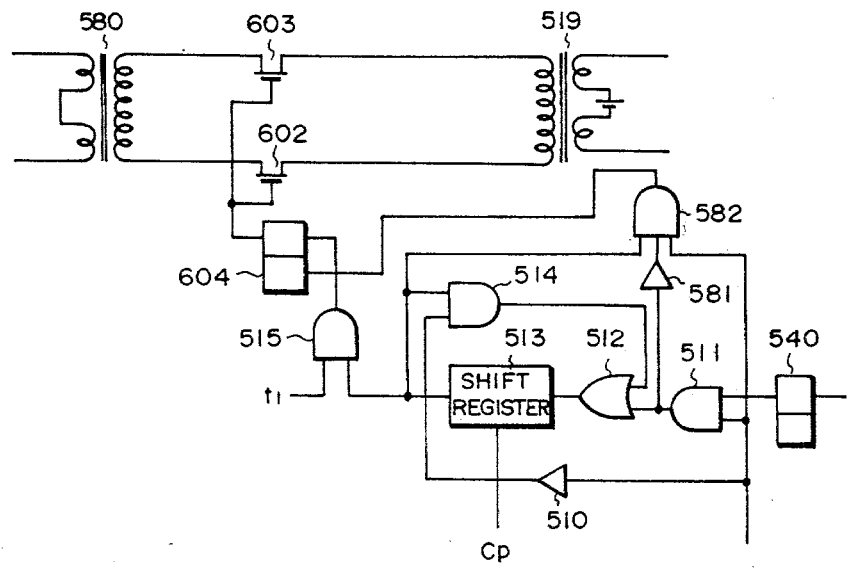

FIG. 14 shows an example of a circuit which is formed by the combined use of transistors and RS flip-flops in place of the thyristors. The operation of this example is as follows: The output signal from the second gate 515 is applied to a set terminal of an RS flip-flop 604 to set it, and for resetting it, the output signal from the gate 582 is applied to a reset terminal of the RS reset terminal to reset it. The output signal from the RS flip-flop 604 is provided to the gates of the transistors 602 and 603 to turn them ON, forming a speech path in the same manner as in the case of FIG. 11.

Figure 15:
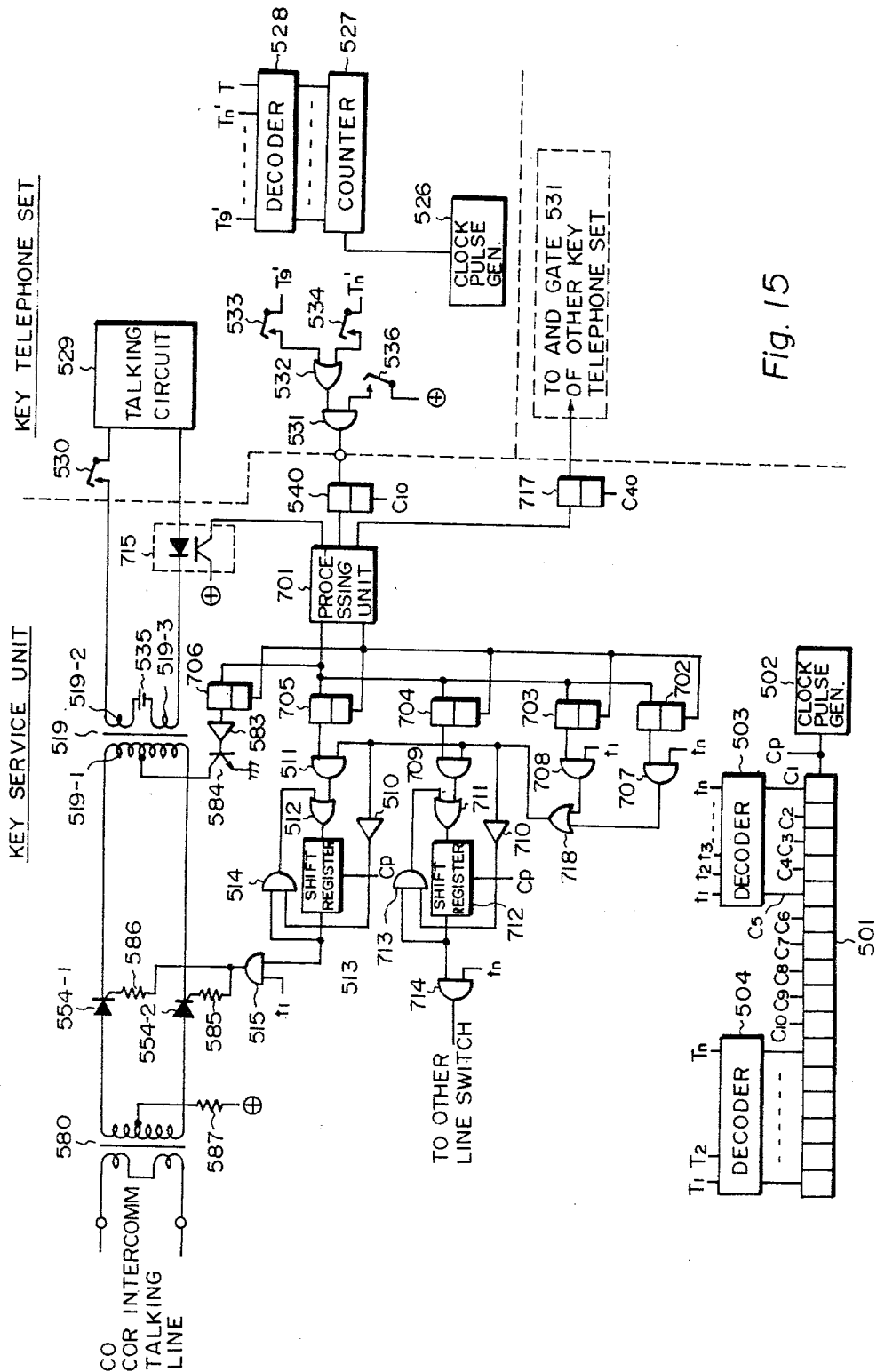

FIG. 15 illustrates a modified form of FIG. 11, in which the input is not applied directly to the circulating memory by the CO line selecting key information but instead it is once applied to a central processing unit for necessary processing and the output therefrom is supplied to the circulating memory. This system is effective, in practice, for combining the function of this invention with another function in a key telephone system, for instance, a privacy function.

The differences between FIGS. 11 and 15 may be summarized as follows:

In FIG. 11, a circulating memory is provided whose memory areas each correspond to one of key telephone sets, and by obtaining the logical product of the time slot determining a particular one of the memory areas of the circulating memory for storing the CO line selecting key information and the time slot for transmitting the information, the arrival of the information is detected and the memory area for the information is assigned.

In FIG. 15, the key information from the key telephone set is once applied to a processing unit for necessary processing, and its output signal is divided into a memory for latching the information corresponding to the key telephone set and a memory for latching the CO line information, and by the logical product of the two pieces of information and the time slot for determining the memory area of the circulating memory, the memory area is determined for storage of the information.

FIG. 11 employs a wired logic, whereas the processing unit of FIG. 15 employs a stored program logic.

Next, FIG. 15 shows an example in which the circulating memory is one shift register corresponding to the key telephone set. The capacity of the memory can be decreased by coding the output from the processing unit, applying, in a code form, the information corresponding to the key telephone set to the shift register, decoding its output and developing it to information corresponding to each key telephone set.

A detailed description will be made with regard to the construction and operation of the embodiment of FIG. 15. In FIG. 15, reference numeral 701 indicates a processing unit; 702, 703, 704, 705 and 706 designate latch memories, each composed of a D flip-flop: 707, 708, 709, 713 and 714 identify AND gates; 710 denotes an inverter; 711 and 718 represent OR gates; 712 shows a shift register; 715 refers to a photo coupler; and 717 indicates a flip-flop similar to that 540. The example of FIG. 15 differs from the example of FIG. 11 in that there are inserted between the flip-flop 540 and the AND gate 511 in FIG. 11 the processing unit 710 and the circuits 702, 703, 705, 707, 708 and 718 which are controlled by the output from the processing unit to control the shift register 513.

The CO line selecting key information from the key telephone set is outputted to the flip-flop 540 in the same manner as in the case of FIG. 11. The output signal from the flip-flop 540 is applied to the processing unit 701, in which it is divided by stored program control into information corresponding to the key telephone set and CO line selecting key information, and the two pieces of information are respectively provided to the flip-flops 705 and 703 to set them, deriving output signals at their output terminals. That is, high-level outputs are provided at the output terminals of the flip-flops 703 and 705, so that they are stored in predetermined memory areas of the shift register 513 in the same manner as in the case of FIG. 11, and the subsequent operations also identical with those in FIG. 11 are achieved.

Another difference between the examples of FIGS. 11 and 15 are as follows: In FIG. 11 the content of the shift register 513 is utilized for controlling the transistor 584. However, in FIG. 15 a memory such as RAM or the like is employed in the processing unit, and in a case where first and second time slots in the CO line selecting key information repeatedly sent out of the key telephone set are detected to differ from each other, the output signal from the processing unit is applied to the flip-flop 706 to set it and its output is provided via the inverter 583 to the base of the transistor 584 to turn OFF its collector-emitter path in a moment. The subsequent operations are identical with those in FIG. 11 and hence will not be described. Further, it is a matter of course that the above-described operations can be replaced by those in FIG. 11.

As described above in detail, this invention can be carried into practice not only by the wired logic method but also by the stored program logic method, and in the cases of a large scall system and a multifunctional system, the use of the stored program logic method is advantageous as compared with the wired logic method.

For turning ON the thyristor, this invention employs the method of applying a repetitive high-speed pulse to its gate. The thyristor is so constructed as to remain in its ON state when a DC current is applied across its anode and cathode, but when the thyristor is used as a line switch, it is altered to its OFF state if an inverse current above an ordinary speech level flows across the anode and cathode due to external noise or the like. Accordingly, in this invention the high-speed repetitive pulse is applied to the gate of the thyristor so as to turn it ON again to such an extent as not to introduce any troubles in practical use when the abovesaid phenomenon occurs.

Next, the example of FIG. 15 is applicable to FIG. 10. Upon dialling in the key telephone set 1201 for calling the key telephone set 1301, the dial impulses are counted by the counter 301 to designate the called party on the basis of the counting result and turn ON the line switch corresponding to the called key telephone.

This can be achieved by using the processing unit 701 and the shift register 712 in FIG. 15 to take place of the counter 301 and the flip-flop 356 in FIG. 10. That is, upon dialing in the talking circuit 529, its dial impulse is applied via the photo coupler 715 to the processing unit 701 in which it is processed, and as a result of this, the output from the processor is stored in the memory area designated by the shift register 712 in the same manner as described above, and the output signal from the shift register is applied via the AND gate 714 to the gate of the speech path switch of the called key telephone set, for example, the speech path switch 355 in FIG. 10 to turn it ON. Thereafter, the same operations as described previously in respect of FIG. 10 take place to enable hand-free talking. This method is advantageous in practice when employed in a large-scaled system, as compared with the method of FIG. 10.

While this invention has been described in connection with the embodiments which employ a shift register, the same results as those obtainable with this invention can also be achieved even if program control by a processor or the like is used by the employment of another memory means, for example, a random access memory (RAM).

As has been described in the foregoing, this invention resides in a talking system for a key telephone system adapted to selectively connect a plurality of key telephone sets to a plurality of CO lines (or intercomm. lines) through a key service unit and pluralities of talking lines and control lines. The key service unit is provided with a first pulse generator (501, 502, 503, 504) for generating clock pulses, a plurality of high-speed time slot pulse trains respectively corresponding to the CO lines (or intercomm. lines) and a plurality of control signal transmitting low-speed time slot pulse trains respectively corresponding to the control lines, a plurality of memories (513) such as circulating memories provided respectively corresponding to the plurality of key telephone sets, a plurality of write means (507, 508, 509, 510, 511 and 540) each provided corresponding to one of the key telephone sets for writing a control output transmitted via a corresponding one of the control lines from the corresponding key telephone set in a corresponding one of the plurality of memories in synchronism with the plurality of control signal transmitting low-speed time slot pulse trains, a switching element (554-1, 554-2) provided in correspondence to one of the CO lines (or intercomm. lines) and one of the key telephone sets and having a holding function controlled by an AND output of the output signal from a corresponding one of the memories and a corresponding one of the plurality of high-speed time slot pulse trains respectively corresponding to the CO lines (or intercomm. lines), and switching means (584) for switching a DC current of the thyristors. The key telephone sets are each provided with a second pulse generator (526, 527, 528) for generating a synchronizing time slot pulse trains substantially synchronized with a corresponding one of the pluralities of control signal transmitting low-speed time slot pulse trains, actuating means (533, 534) including a plurality of CO line (or intercomm. line) selecting keys respectively corresponding to the CO lines (or intercomm. lines), and control output means (531, 532, 536) for deriving the control output from the corresponding key telephone set by an AND output of the output from the actuating means and the synchronizing time slot pulse train. One of the CO lines (or intercomm. lines), which is selected by the aforesaid control output sent out by the selecting operation of the CO line (or intercomm. line) selecting key, is connected to the abovesaid corresponding key telephone set to enable talking with the selected CO line.

Further, the abovesaid switching means can be associated with control means (581, 582) which provides an output in response to a change in the written content of the memory to control the switching element (554-1, 554-2) to open or close it.

As has been described above, this invention enables marked reduction of the number of cable conductors interconnecting a key service unit and key telephone sets in a key telephone system and hence is of great utility in saving of resources, reduction of cost and enhancement of reliability.

As described above, this invention also resides in a hand-free talking system in a key telephone system which is adapted so that a plurality of key telephone sets respectively having a function of sending out a dial signal are connected selectively to a plurality of CO lines through a key service unit and pluralities of talking lines and control lines. The plurality of key telephone sets are each provided with a receiver circuit (361, 363) including a speaker, a transmitter circuit (362, 364) including a microphone and a hybrid circuit (365) for connecting the receiver and the transmitter circuit to a talking circuit. The key service unit is provided with a plurality of switching means (354, 355, 356, 544-1, 544-2, 602, 603, 601, 604) respectively having a self-holding function and inserted in the talking lines corresponding to the plurality of key telephone sets, selecting means (352, 353, 507, 508, 509, 510, 511, 512, 513, 514, 515) for performing a selecting operation of detecting, by counting means (351, 312), the dial signal transmitted via the talking circuit from a calling one of the plurality of key telephone sets for selecting a called one of them to close one of the plurality of switching means corresponding to the called key telephone set and to retain the closed switching means in its self-holding state and releasing means (366, 373, 374, 581, 582, 583, 584) for releasing the plurality of switching means from their self-holding state. In the called key telephone set corresponding to the self-holding one of the plurality of switching means, hand-free answering is enabled while the switching means is in its self-maintaining state. It is customary in the art that the releasing means is so constructed as to release the self-holding state by a control signal from the called key telephone set; in the case of FIG. 10, the releasing means is arranged to perform the releasing operation in response to the off-hooking of the called key telephone set. In the case of FIG. 11, the releasing means is adapted to achieve the releasing operation in response to control of a control button provided in the called key telephone set. However, it is possible to provide the releasing switch 366 of FIG. 10 in the calling key telephone set 1201 so that the abovesaid releasing means releases the self-holding state in response to on-hooking of the calling key telephone set. Further, it is also possible to construct the releasing means of FIG. 11 or FIG. 14 so that it may operate a certain period of time after the operation of the switching means to automatically perform the releasing operation when the aforesaid self-holding state has continued for a predetermined period of time.

As has been described in the foregoing, according to this invention, in the band-free talking system for the key telephone system, dial counter is shortened to enhance the efficiency of utilization of the dial counter and hence enable an essential reduction of cost. Accordingly, this invention is of great utility in practical use.

What we claim is:

1. A key telephone system adapted to selectively connect a plurality of key telephone sets to a plurality of CO lines through a key service unit and pluralities of talking lines and control lines and provided with a calling device in at least one of the key telephone sets; in which the key service unit has a first pulse generator for generating clock pulses, a plurality of modulation and demodulation high-speed time slot pulse trains one to one corresponding to the CO lines, a plurality of control signal transmitting low-speed time slot pulse trains one to one corresponding to the plurality of control lines, a CO line holding high-speed time slot pulse train and a CO line holding low-speed time slot pulse train, a plurality of memories, such as circulating memories each one to one corresponding to one of the plurality of key telephone sets, a plurality of first write means each provided corresponding to one of the plurality of key telephone sets for writing a CO line control output transmitted from the corresponding key telephone set via the control line in a corresponding one of the plurality of memories in synchronism with the AND output of a corresponding one of the plurality of control signal transmitting low-speed time slot pulse trains and a corresponding one of the plurality of modulation and demodulation high-speed time slot pulse trains, a plurality of first bistable circuits respectively corresponding to the plurality of CO lines, a plurality of second bistable circuits each provided corresponding to one of the plurality of first bistable circuits and reset by the output of a corresponding one of the first bistable circuits, a plurality of CO line closing means each provided corresponding to one of the CO lines for forming a loop of the corresponding CO line when a corresponding one of the plurality of second bistable circuits is in a predetermined state, a plurality of first gate means each provided corresponding to one of the CO lines for putting a corresponding one of the second bistable circuits in the predetermined state with an output read out of a corresponding one of the memories in the time slot of a designated one of the plurality of modulation and demodulation high-speed time slot pulse trains, at least one third bistable circuit provided in correspondence to the calling device and supplied with a holding control therefrom in synchronism with the AND output of the control signal transmitting low-speed time slot pulse train and the CO line holding high-speed time slot pulse train to be set in synchronism with the CO line holding low-speed time slot pulse train, a delay circuit for delaying the output signal from the third bistable circuit for a certain period of time, third gate means provided corresponding to the calling device for applying the content of a corresponding one of the plurality of circulating memories to a corresponding one of the plurality of first gate means in accordance with one state corresponding to the output from the delay circuit, and a plurality of second gate means each provided corresponding to one of the plurality of CO lines for deriving an output from a corresponding one of the plurality of third gate means with a designated one of the modulation and demodulation high-speed time slot pulse trains to put a corresponding one of the plurality of second bistable circuits into the predetermined state with the output read out of the third gate means; in which the key telephone sets each have a second pulse generator for generating a synchronizing time slot pulse train substantially synchronized with a corresponding one of the plurality of control signal transmitting low-speed time slot pulse trains and a CO line holding synchronizing time slot pulse train substantially synchronized with the CO line holding low-speed time slot pulse train, actuating means including a plurality of CO line selecting keys one to one corresponding to the CO lines and one CO line holding key, and first control output means for deriving the CO line control output from a corresponding one of the key telephone sets with the AND output of the output from the actuating means and the synchronizing time slot pulse trains; in which a desired one of the plurality of key telephone sets is adapted so that one of the CO lines selected by the CO line control output sent out by the designating operation of the CO line selecting key is connected to the key telephone set on a time shared basis to enable talking with the CO line, the desired one of the key telephone set further having second actuating means including individual calling keys in the calling device respectively corresponding to the key telephone sets, a common contact ganged with the actuating means, and second control output means for deriving a control signal from the calling device with the AND output of outputs from the common contact and the second pulse generator; and in which one of the CO lines selected by the actuation of a selected one of the CO line selecting keys is formed into a loop in a desired one of the plurality of key telephone sets and held by the actuation of the CO line holding key.

2. A key telephone system adapted to selectively connect a plurality of key telephone sets to a plurality of CO lines through a key service unit and pluralities of talking lines and control lines according to claim 1; wherein the plurality of key telephone sets each is provided with a plurality of CO line selecting switches respectively corresponding to the CO lines, wherein said calling device has a plurality of calling switches respectively corresponding to the plurality of key telephone sets; wherein the key service unit is provided with a plurality of first memory means respectively corresponding to the plurality of key telephone sets and at least one second memory means in correspondence to the calling device, and wherein when an incoming call from a one of the CO lines is received, a corresponding one of the plurality of CO line selecting switches is depressed to store information indicative of the selected CO line in the first memory means, and when it is desired to transfer the incoming call after answering it, that one of the plurality of calling switches indicating the called key telephone set is depressed to store information indicative of the called key telephone set in the second memory means, the stored contents of the first and the second memory means are read out and transmitted to the called key telephone set to indicate therein its called state and the selected CO line.

3. A key telephone system adapted to selectively connect a plurality of key telephone sets to a plurality of CO lines through a key service unit and pluralities of talking lines and control lines, wherein the key service unit is provided with a first pulse generator for generating clock pulses, a plurality of high-speed time slot pulse trains respectively corresponding to the CO lines and a plurality of control signal transmitting low-speed time slot pulse trains respectively corresponding to the control lines, a plurality of first circulating memories respectively corresponding to the plurality of key telephone sets and a plurality of first write means each provided for writing a control output transmitted via the control lines from a corresponding one of the key telephone set in a corresponding one of the plurality of first circulating memories in synchronism with the plurality of control signal transmitting low-speed time slot pulse trains, wherein the plurality of key telephone sets is each provided with a second pulse generator for generating a synchronizing time slot pulse train substantially synchronized with a corresponding one of the plurality of control signal transmitting time slot pulse trains, first actuating means including a plurality of CO line selecting keys respectively corresponding to the CO lines and control output means for deriving the control output from a corresponding one of the key telephone sets by an AND output of the output from the first actuating means and the synchronizing time slot pulse train, wherein a calling device provided in a particular one of the plurality of key telephone sets is provided with second actuating means including individual calling keys respectively corresponding to the key telephone sets and first control output means for deriving a call control signal from the calling device by an AND output of the output from the second actuating means and the synchronizing time slot pulse train, and wherein the key service unit is further provided with second circulating memories connected via a second control line with the first control output means and corresponding to the calling device, write means for reading the output signal from the first circulating memory so as to write a call control signal transmitted via the control line from the calling device in a corresponding one of the second circulating means in synchronism with the plurality of control signal transmitting low-speed time slot pulse train and transmitting means for reading out the stored contents of the first and the second circulating memory and transmitting them to a called one of the key telephone sets selected by the calling key to indicate the called state of the called key telephone set and one of the CO lines selected by one of the CO line selecting keys.

4. A key telephone system according to claim 3, wherein there are provided in the key service unit, as the transmitting means, decoding means for decoding the content of the second circulating memory having stored therein in a coded form the call signal transmitted from the calling device, first gate means controlled by the output from the decoding means and a ringer connected via the first gate means to the communication lines, wherein the plurality of key telephone sets is each provided with a speaker circuit connected to the talking lines, and wherein when the call control signal is sent out of the calling device, the output signal from the ringer is applied to the speaker circuit to drive a speaker.

5. A key telephone system according to claim 3, wherein the transmitting means includes converting means provided in the key service unit for decoding the output from the second circulating memory and converting the decoded output to pulses synchronized with the control signal transmitting low-speed time slot pulse train and indicating means provided in each of the plurality of key telephone sets, and wherein the output from the converting means is transmitted via a control line to the indicating means to produce an indication.

6. A key telephone system according to claim 3, wherein the calling device is further provided with a common contact ganged with the second actuating means and second control output means for deriving a control signal from the calling device by an AND output of the output from the common contact and the control signal transmitting low-speed time slot pulse, the second control output means being connected via a second control line to the key service unit, wherein the key service unit is further provided with a bistable circuit corresponding to the calling device and second gate means controlled by the output from the bistable circuit and connected to the output of the second circulating memory, and wherein the bistable circuit is set by the control signal transmitted via the second control line from the calling device to control the second gate means to control the output signal from the second circulating memory.

7. A key telephone system adapted to selectively connect a plurality of key telephone sets to a plurality of CO lines or intercomm. lines through a key service unit and pluralities of talking lines and control lines; wherein the key service unit is provided with a first pulse generator for generating clock pulses, a plurality of high-speed time slot pulse trains respectively corresponding to the CO lines or intercomm. lines and a plurality of control signal transmitting low-speed time slot pulse trains respectively corresponding to the plurality of control lines, a plurality of memories such as circulating memories provided respectively corresponding to the plurality of key telephone sets, a plurality of write means each provided corresponding to one of the key telephone sets for writing a control output transmitted via a corresponding one of the control lines from the corresponding key telephone set in a corresponding one of the plurality of memories in synchronism with the plurality of control signal transmitting low-speed time slot pulse trains, a switching element provided corresponding to one of the CO lines or intercomm. lines and one of the key telephone sets and having a holding function controlled by an AND output of the output signal from a corresponding one of the memories and a corresponding one of the plurality of high-speed time slot pulse trains respectively to the CO lines or intercomm. lines and switching means for controlling the switching element; wherein the plurality of key telephone sets are each provided with a second pulse generator for generating a synchronizing time slot pulse train substantially synchronized with a corresponding one of the plurality of control signal transmitting low-speed time slot pulse trains, actuating means including a plurality of CO line or intercomm. line selecting keys respectively corresponding to the CO lines or intercomm. lines and control output means for deriving the control output from the corresponding key telephone set by an AND output of the output from the actuating means and the synchronizing time slot pulse train; and wherein one of the CO lines or intercomm. lines selected by the control output sent out by the selecting operation of one of the selecting keys of one of the key telephone sets is connected to the key telephone set to enable talking.

8. A key telephone system according to claim 7, wherein the switching means includes control means which provides an output in response to a change in the written content of the memory to control the switching element to open or close it.

9. A key telephone system which is adapted so that a plurality of key telephone sets each having a function of sending out a dial signal are connected selectively to a plurality of CO lines through a key service unit and pluralities of talking lines and control lines; wherein the plurality of key telephone sets are each provided with a receiver circuit including a sepaker, a transmitter circuit including a microphone and a hybrid circuit for connecting the receiver circuit and the transmitter circuit to a talking circuit; wherein the key service unit is provided with a plurality of switching means each having a self-holding function and inserted in the talking lines corresponding to the plurality of key telephone sets, selecting means for performing a selecting operation of detecting the dial signal transmitted via the talking circuit from a calling one of the plurality of key telephone sets for selecting a called one of them to close one of the plurality of switching means corresponding to the called key telephone set and to retain the closed switching means in its self-holding state, and releasing means for releasing the plurality of switching means from their self-holding state, and wherein the called key telephone set corresponding to the self-holding one of the plurality of switching means is capable of performing hand-free answering during the self-holding state.

10. A key telephone system according to claim 9, wherein the releasing means is constructed so that the self-holding state is released by control from the called key telephone set.

11. A key telephone system according to claim 10, wherein the releasing means is so constructed as to perform the releasing operation in response to off-hooking of the called key telephone set.

12. A key telephone system according to claim 10, wherein the releasing means is so constructed as to perform the releasing operation in response to control of a control button provided in the called key telephone set.

13. A key telephone system according to claim 9, wherein the releasing means is so constructed as to release the self-holding state in response to on-hooking of the calling key telephone set.

14. A key telephone system according to claim 9, wherein the releasing means is so constructed as to automatically perform the releasing operation when the self-holding state has continued for a predetermined period of time.

15. A key telephone system which is adapted so that a plurality of key telephone sets each having a function of sending out a dial signal are connected selectively to a plurality of CO lines through a key service unit and pluralities of talking lines and control lines; wherein the plurality of key telephone sets are each provided with a receiver circuit including a speaker, a transmitter circuit including a microphone and a hybrid circuit for connecting the receiver circuit and the transmitter circuit to a communication circuits; wherein the key service unit is provided with a plurality of switching means each having a self-holding function and inserted in the talking lines corresponding to the plurality of key telephone sets, selecting means for performing a selecting operation of detecting the dial signal transmitted via the talking circuit from a calling one of the plurality of key telepone sets for selecting a called one of them to close one of the plurality of switching means corresponding to the called key telephone set and to retain the closed switching means in its self-holding state, releasing means for releasing the plurality of switching means from their self-holding state and power source ON-OFF means for connecting a power source to the receiver circuit and the transmitting circuit only during the self-holding state, and wherein the called key telephone set corresponding to the self-holding one of the plurality of switching means is capable of performing hand-free answering during the self-holding state.

16. A key telephone system according to claim 15, wherein the releasing means is constructed so that the self-holding state is released by control from the called key telephone set.

17. A key telephone system according to claim 16, wherein the releasing means is so constructed as to perform the releasing operation in response to off-hooking of the called key telephone set.

18. A key telephone system according to claim 16, wherein the releasing means is so constructed as to perform the releasing operation in response to control of a control button provided in the called key telephone set.

19. A key telephone system according to claim 15, wherein the releasing means is so constructed as to release the self-holding state in response to on-hooking of the calling key telephone set.

20. A key telephone system according to claim 15, wherein the releasing means is so constructed as to automatically perform the releasing operation when the self-holding state has continued for a predetermined period of time.

* * * * *